US012647502B2

(12) United States Patent
Kim et al.

(10) Patent No.: US 12,647,502 B2
(45) Date of Patent: Jun. 2, 2026

(54) CAMERA MODULE AND MOBILE TERMINAL

(71) Applicant: LG INNOTEK CO., LTD., Seoul (KR)

(72) Inventors: Ji Sung Kim, Seoul (KR); Ki Hyun Kim, Seoul (KR); Jung Goo Ji, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 558 days.

(21) Appl. No.: 17/997,001

(22) PCT Filed: Apr. 23, 2021

(86) PCT No.: PCT/KR2021/005184
§ 371 (c)(1),
(2) Date: Oct. 24, 2022

(87) PCT Pub. No.: WO2021/215880
PCT Pub. Date: Oct. 28, 2021

(65) Prior Publication Data
US 2023/0171336 A1     Jun. 1, 2023

(30) Foreign Application Priority Data

Apr. 24, 2020    (KR) ........................ 10-2020-0050272
Apr. 24, 2020    (KR) ........................ 10-2020-0050292
Apr. 24, 2020    (KR) ........................ 10-2020-0050307

(51) Int. Cl.
H04M 1/02          (2006.01)
H04N 23/55         (2023.01)
(Continued)

(52) U.S. Cl.
CPC .......... H04M 1/0264 (2013.01); H04N 23/55 (2023.01); H04N 23/57 (2023.01); H04N 23/90 (2023.01)

(58) Field of Classification Search
CPC .......... G02B 7/10; G03B 17/04; G03B 19/22; H04M 2250/50
See application file for complete search history.

(56) References Cited

U.S. PATENT DOCUMENTS 4,451,129 A * 5/1984 Ikari ...................... G03B 19/07
396/270
7,612,949 B2    11/2009 Ohtake et al.
(Continued)

FOREIGN PATENT DOCUMENTS

CN          101211004 A        7/2008
CN          108957679 A        12/2018
(Continued)

OTHER PUBLICATIONS

International Search Report dated Aug. 13, 2021 in International Application No. PCT/KR2021/005184.
(Continued)

*Primary Examiner* — Noam Reisner
(74) *Attorney, Agent, or Firm* — SALIWANCHIK, LLOYD & EISENSCHENK

(57)          ABSTRACT

A camera module disclosed in an embodiment of the invention includes: a first holder having a plurality of first lens groups arranged in a first direction; a second holder having a plurality of second lens groups arranged in the first direction; and a first driving means for moving the first holder having the plurality of first lens groups in the optical axis direction, wherein each of the plurality of first lens groups may include a plurality of lenses, and each of the plurality of second lens groups may include a plurality of lenses.

19 Claims, 29 Drawing Sheets

(51) Int. Cl.
  H04N 23/57 (2023.01)
  H04N 23/90 (2023.01)

(56) References Cited

U.S. PATENT DOCUMENTS

| | | | |
|---|---|---|---|
| 7,619,654 | B2 | 11/2009 | Ito et al. |
| 8,203,612 | B2 | 6/2012 | Ito et al. |
| 10,372,022 | B2 | 8/2019 | Avivi et al. |
| 10,955,641 | B2 | 3/2021 | Hu et al. |
| 2004/0227844 | A1 | 11/2004 | Sakamoto |
| 2005/0094284 | A1 | 5/2005 | Takahashi |
| 2006/0115257 | A1 | 6/2006 | Nomura |
| 2006/0176373 | A1 | 8/2006 | Ito et al. |
| 2008/0158688 | A1 | 7/2008 | Ohtake et al. |
| 2010/0007747 | A1 | 1/2010 | Ito et al. |
| 2010/0026878 | A1 | 2/2010 | Seo |
| 2012/0242883 | A1* | 9/2012 | Pavithran ............... H04N 23/57 348/340 |
| 2014/0362285 | A1 | 12/2014 | Min et al. |
| 2017/0192199 | A1 | 7/2017 | Park |
| 2017/0353633 | A1 | 12/2017 | Eromaki |
| 2018/0031860 | A1* | 2/2018 | Bachar ..................... G02B 7/06 |
| 2018/0372988 | A1 | 12/2018 | Hu et al. |
| 2020/0089020 | A1 | 3/2020 | Lee et al. |
| 2021/0136261 | A1 | 5/2021 | Lee |

FOREIGN PATENT DOCUMENTS

| | | | |
|---|---|---|---|
| JP | 8-221779 | A | 8/1996 |
| JP | 10-32740 | A | 2/1998 |
| JP | 2000-23002 | A | 1/2000 |
| JP | 2005-77787 | A | 3/2005 |
| JP | 2006-243701 | A | 9/2006 |
| JP | 2014-10400 | A | 1/2014 |
| KR | 10-0691439 | B1 | 3/2007 |
| KR | 10-2007-0121304 | A | 12/2007 |
| KR | 10-2008-0034726 | A | 4/2008 |
| KR | 10-2010-0010378 | A | 2/2010 |
| KR | 10-2014-0142918 | A | 12/2014 |
| KR | 10-2015-0122944 | A | 11/2015 |
| KR | 10-2017-0081369 | A | 7/2017 |
| KR | 10-2017-0126993 | A | 11/2017 |
| KR | 10-2018-0081981 | A | 7/2018 |
| KR | 10-2018-0097012 | A | 8/2018 |
| KR | 10-2019-0066664 | A | 6/2019 |
| KR | 10-2019-0086917 | A | 7/2019 |
| KR | 10-2019-0119832 | A | 10/2019 |
| KR | 10-2019-0124055 | A | 11/2019 |
| TW | 201037387 | A | 10/2010 |

OTHER PUBLICATIONS

Office Action dated Oct. 23, 2024 in Korean Application No. 10-2020-0050292.

Supplementary European Search Report dated Oct. 4, 2023 in European Application No. 21792193.1.

Office Action dated Feb. 4, 2025 in Japanese Application No. 2022-564307.

Office Action dated Apr. 23, 2025 in Korean Application No. 10-2020-0050272.

Office Action dated May 16, 2025 in Chinese Application No. 202180030598.7.

* cited by examiner

CAMERA MODULE AND MOBILE TERMINAL

CROSS-REFERENCE TO RELATED APPLICATIONS

This application is the U.S. national stage application of International Patent Application No. PCT/KR2021/005184, filed Apr. 23, 2021, which claims the benefit under 35 U.S.C. § 119 of Korean Application Nos. 10-2020-0050272, filed Apr. 24, 2020; 10-2020-0050292, filed Apr. 24, 2020; and 10-2020-0050307, filed Apr. 24, 2020; the disclosures of each of which are incorporated herein by reference in their entirety.

TECHNICAL FIELD

An embodiment of the invention relates to a camera module and a mobile terminal having the same.

BACKGROUND ART

As smartphones or tablet PCs become popular, camera modules mounted on portable terminals such as smartphones or tablet PCs are replacing portable cameras (digital cameras, etc.). As the development of camera modules to which high-definition sensors are applied has rapidly increased and multi-functional smart phones such as high-magnification phones and foldable phones have been developed, since a part of the camera module is protruding, there is need to reduce the height or thickness of the camera module with high magnification.

DISCLOSURE

Technical Problem

An embodiment of the invention may provide a camera module in which a first lens group having a plurality of lens modules is moved in an optical axis direction or a vertical direction, and a second lens group having a plurality of lens modules may be moved in a horizontal direction. An embodiment of the invention may provide a camera in which a plurality of first lens groups having a plurality of lens modules is integrally moved in an optical axis direction or a vertical direction, and a second lens group having a plurality of lens modules may be integrally moved in a horizontal direction. An embodiment of the invention may provide a camera module and a mobile terminal having the same so that a plurality of first lens groups of a plurality of camera modules may be moved in an optical axis direction or a vertical direction to protrude or be accommodated through a case of the terminal. An embodiment of the invention may provide a camera module in which a plurality of first lens groups and a plurality of second lens groups overlap in an optical axis direction or horizontally according to a driving mode, and a mobile terminal having the same. An embodiment of the invention may provide a camera module that protrudes to the outside of the terminal when the camera is driven and may be accommodated inside the terminal when the camera is not driven, and a mobile terminal having the same. An embodiment of the invention may provide a camera module in which a plurality of lenses is stacked in a direction orthogonal to the thickness of the terminal. An embodiment of the invention may provide a camera module in which optical axis passing through the centers of the plurality of lenses are aligned in the driving mode, and the centers of the plurality of lenses are shifted from each other in the non-driving mode. An embodiment of the invention may provide a camera module in which a lens portion having a plurality of lenses may be slid down or slid up in an optical axis direction. An embodiment of the invention may provide a camera module and a mobile terminal having the same so that the module having a plurality of lenses protrudes onto the case of the terminal when driven and does not protrude from the case of the terminal when not driven. An embodiment of the invention may provide a camera module capable of moving the camera up or down in the direction of the case of the terminal according to whether the camera is operated, and a mobile terminal having the same.

Technical Solution

A camera module according to an embodiment of the invention comprises: a first holder having a plurality of first lens groups arranged in a first direction; a second holder having a plurality of second lens groups arranged in the first direction; and a first driving means for moving the first holder having the plurality of first lens groups in an optical axis direction, wherein each of the plurality of first lens groups and each of the plurality of second lens groups may have a plurality of lenses aligned with different optical axes.

According to an embodiment of the invention, the camera module includes a second driving means for moving a second holder having the plurality of second lens groups in a direction orthogonal to the optical axis, wherein the first holder may be overlapped in a horizontal direction or a vertical direction to the second holder. The camera module may include a plurality of image sensors disposed under each of the plurality of second lens groups; and a printed circuit board on which the plurality of image sensors is disposed. The plurality of second lens groups may be moved in a second direction orthogonal to the first direction. The first and second driving means simultaneously move the first and second holders so as to overlap in the vertical direction in the driving mode, and when a switching signal is applied from the driving mode to the non-driving mode, the first holder is down direction and the second holder may be simultaneously driven to move in a horizontal direction with respect to the lower portion of the first holder. Each of the first and second lens groups includes three lens modules, one of the three lens modules may be a wide-angle lens module, and the other one may be a telephoto lens module. A length in the first direction of the first holder having the plurality of first lens groups is equal to or greater than a length in the second direction, and a length in the first direction of the second holder having the plurality of second lens groups may be less than or equal to a length of the second direction. Each of the first and second driving means may include at least one of a piezo member, an actuator, or a stepping motor.

According to an embodiment of the invention, the plurality of first lens groups includes a 1-1 lens group and a 1-2 lens group arranged in a first direction, and the plurality of second lens groups includes a 2-1 lens group and a 2-2 lens group arranged in the first direction, wherein the 1-1 lens group and the 2-1 lens group are a first lens module, and the 1-2 lens group and the 2-2 lens group is a second lens module, a lens closest to an object side in the 1-1 lens group and the 2-1 lens group has a positive refractive power, and a lens closest to the object side in the 1-2 lens group and the 2-2 lens group may have a negative refractive power. A thickness of the first holder may be in the range of 30% to 40% of the TTL of a total optical system, and a thickness of the second holder may be in the range of 50% to 60% of the TTL of the total optical system.

A camera module according to an embodiment of the invention comprises a first holder having a plurality of first lens groups; a second holder having a plurality of second lens groups; and a driving means for moving the first holder having the plurality of first lens groups in an optical axis direction, wherein the first holder overlaps the second holder in a vertical direction, and the plurality of first lens groups includes one direction, each of the plurality of first lens groups may have a plurality of lenses, and each of the plurality of second lens groups may have a plurality of lenses and may be vertically overlapped with each of the plurality of first lens groups.

A camera module according to an embodiment of the invention comprises: a housing having a plurality of lens modules each having a first lens group and a second lens group in a vertical direction; a driving means for moving the first lens group from the housing in an optical axis direction, wherein the housing includes: a first holder for supporting a first lens group of each of the plurality of lens modules; and a second holder for supporting a second lens group of each of the plurality of lens modules, wherein the first holder and the first lens group may be moved to pop up or down at the same time by the driving means. The minimum distance between the lenses of the first lens group and the lenses of the second lens group facing each other is 0.5 mm or less, and the maximum distance between the lenses of the first lens group and the lenses of the second lens group facing each other is 4 mm or more.

A camera module according to an embodiment of the invention comprises a first reflective mirror for reflecting incident light, a second reflective mirror for reflecting the light reflected through the first reflective mirror; a lens module disposed between the first and second reflective mirrors and having a plurality of lenses; a holder for supporting each lens of the first reflective mirror, the second reflective mirror, and the lens module; a first guide shaft connected to one side of the holder and sliding down or up each lens of the first reflective mirror, the second reflective mirror, and the lens module; and a driving means for driving the first guide shaft.

According to an embodiment of the invention, the camera module includes at least one second guide shaft connected to the other side of the holder and supporting movement of the first reflective mirror, the second reflective mirror, and the lens module. The driving means may include a movable member connected to the first guide shaft and a stator facing the movable member. The driving means may include at least one of a piezo member, an actuator, and a stepping motor. The first reflective mirror, each lens, and the second reflective mirror are moved toward the second reflective mirror by sliding up of the first guide shaft, and the first reflective mirror, each lens, and the second reflective mirror are moved toward the first reflective mirror by sliding down of the first guide shaft. The camera module may include a holder for supporting each of the first reflective mirror, each lens, the outside of the second reflective mirror, and a movement guide portion through which the first guide shaft passes. The camera module has a transparent window on the upper portion of the first reflective mirror, and may slide together with a protective cover that protects the upper portion of the lens module. The difference in the height of the upper end of the sliding lens module may be in the range of 25% to 35% of the height or diameter of the lens module. The camera module may include an image sensor condensing the light reflected from the second reflective mirror; and a printed circuit board on which the image sensor is disposed. The mobile terminal according to an embodiment of the invention may include the camera module.

Advantageous Effects

The camera module according to the embodiment of the invention may pop-up or protrude from the terminal only when driving, or, conversely, when not driven, may be down (Pop-down) or accommodated, thereby improving the appearance and inhibiting deterioration of the lens performance. The camera module may provide a long TTL when driving, and protect the lenses in a non-driving state. Since each of the plurality of first lens groups and/or the plurality of second lens groups is moved together integrally, the number of lens drivers may not be increased and the optical axes of the plurality of lens modules may be aligned at the same time.

In the camera module according to the embodiment of the invention, even if the thickness of the lens module is increased according to the performance, there is an effect that a part of the camera module does not protrude when the camera is not used or in a non-driving state. In addition, it is possible to improve the appearance design of the high-magnification portable terminal, and to improve the reliability of the mobile terminal, such as a multi-function phone.

The camera module according to the embodiment of the invention may be sliding-up or protruding from the terminal only when driving, or may be pop-down or accommodated when not driving, improving the appearance and inhibiting deterioration of the lens performance. Since the lenses is disposed perpendicular to the thickness direction of the portable terminal, it is possible to provide a long TTL of the optical system and protect the lenses in a non-driving state. The invention may reduce the height or thickness of the lens module by tilting and receiving a plurality of lenses, and while having functions such as auto focus adjustment, zoom, and image stabilization, the structure is simple, the module size may be reduced, and power consumption may be minimized. Even if the number of lenses of the lens module is increased according to the performance, there is an effect that a part of the camera module does not protrude when the camera is not used or in a non-driving state.

DESCRIPTION OF DRAWINGS

FIGS. 9 to 11 are driving examples of lens groups of the camera module of FIG. 8.

FIG. 25A is a state before use of the camera, FIG. 25B is a state of use of the camera.

FIG. 34 is another example of the holder and guide shaft of FIG. 32.

FIG. 35 is a view for explaining an example of coupling a transparent cover on the camera module of FIG. 28.

BEST MODE

Figure 1:
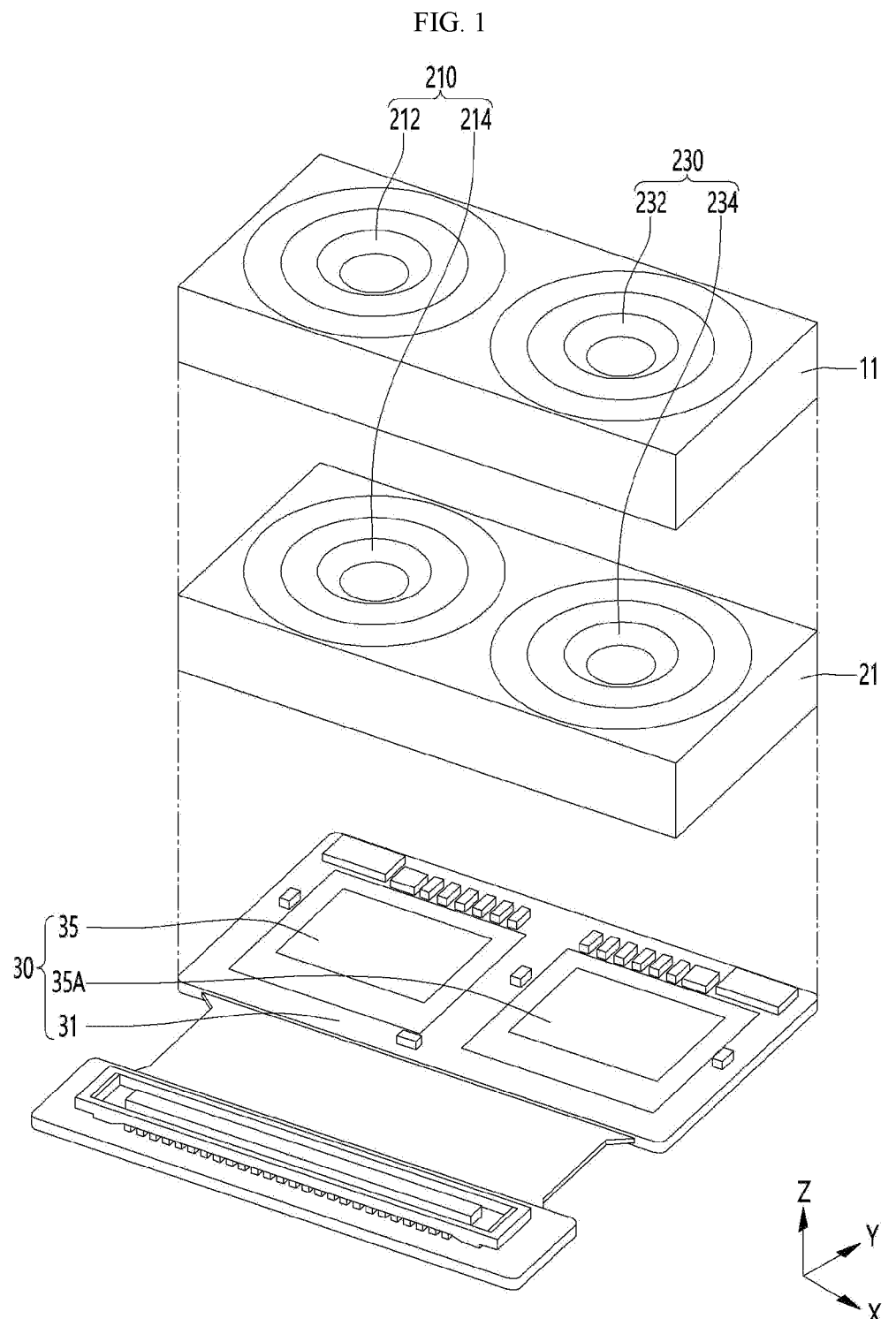
FIG. 1 is an exploded perspective view of a camera module according to a first embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

An 'optical axis direction' used below is defined as an optical axis direction of a lens of a camera device. In this case, the optical axis of the lens may correspond to the optical axis of the image sensor. Meanwhile, the 'optical axis direction' may correspond to the 'up and down direction' or the 'z-axis direction'. The 'autofocus function' is defined as a function that automatically focuses on the subject by adjusting the distance from the image sensor by moving the lens in the optical axis direction according to the distance of the subject so that a clear image of the subject may be obtained on the image sensor. Meanwhile, 'auto focus' may be used interchangeably with 'AF (Auto Focus)'. The 'image stabilization function' is defined as a function that moves or tilts the lens in a direction perpendicular to the optical axis direction to cancel the vibration (movement) generated in the image sensor by an external force. Meanwhile, 'image stabilization' may be used interchangeably with 'Optical Image Stabilization (OIS)'. "Dual or triple camera" and "camera device" may be used interchangeably. That is, the camera device may be described as including two or three lens modules.

The optical device may be any one of a mobile phone, a mobile phone, a smart phone, a portable smart device, a digital camera, a laptop computer, a digital broadcasting terminal, a PDA (Personal Digital Assistants), a PMP (Portable Multimedia Player), and a navigation device. However, the type of optical device is not limited thereto, and any device for taking an image or photo may be included in the optical device. The optical device may include a main body. The main body may form the appearance of the optical device. The main body may accommodate the camera device. A display portion may be disposed on one surface of the main body. For example, a display portion and a camera device may be disposed on one surface of the main body, and a camera device may be additionally disposed on the other surface (a surface positioned opposite to one side) of the main body. The optical device may include a display portion. The display portion may be disposed on one surface of the main body. The display portion may output an image captured by the camera device. The optical device may include a camera device. The camera device may be disposed on the main body. At least a part of the camera device may be accommodated in the main body. A plurality of camera devices may be provided. The camera device may be disposed on one surface of the main body and the other surface of the main body, respectively. The camera device may capture an image of the subject. The camera device may include a lens driving device. The lens driving device may be a lens driving motor or a voice coil motor. The camera device may include at least one or both of an AF actuator and an OIS actuator.

First Embodiment

Figure 2:
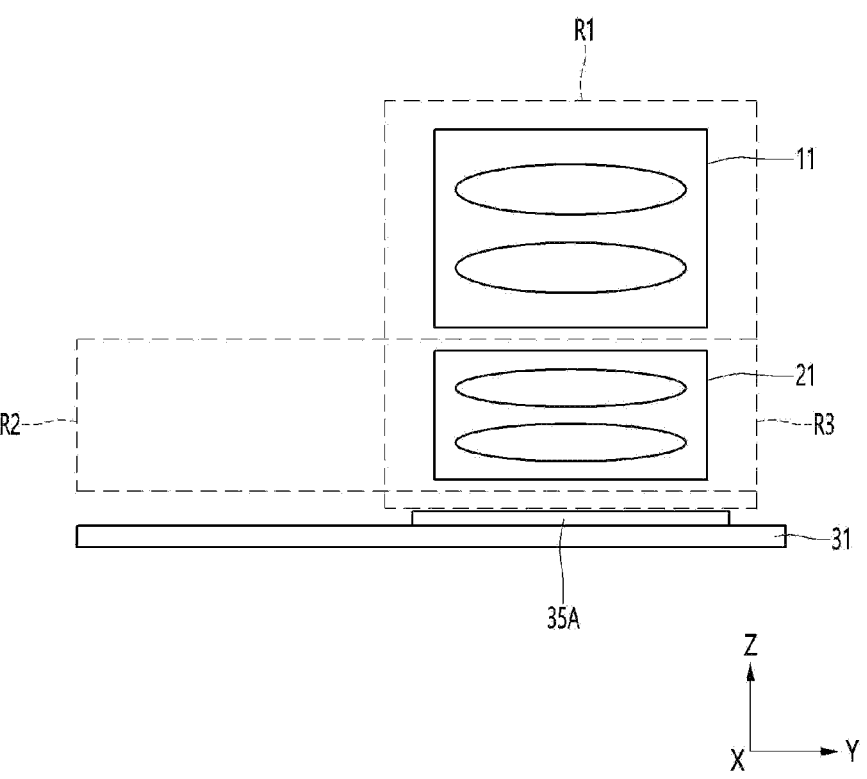
FIG. 2 is an example of a cross-sectional side view in which first and second lens groups of the camera module of FIG. 1 are coupled.
Figure 3:
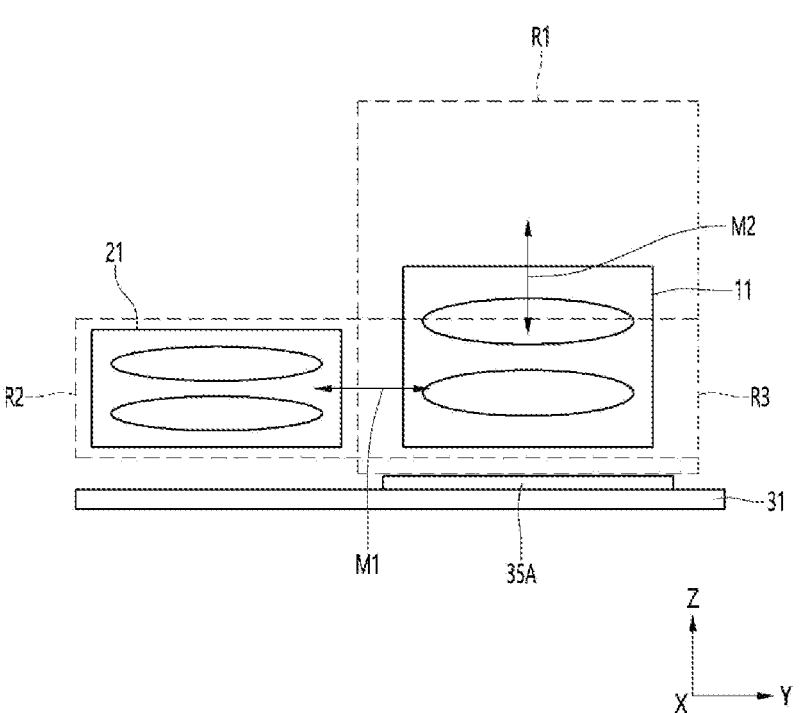
FIG. 3 is an example of a side cross-sectional view illustrating an example of driving a first lens group and a second lens group in the camera module of FIG. 2.
Figures 4A, 4B:
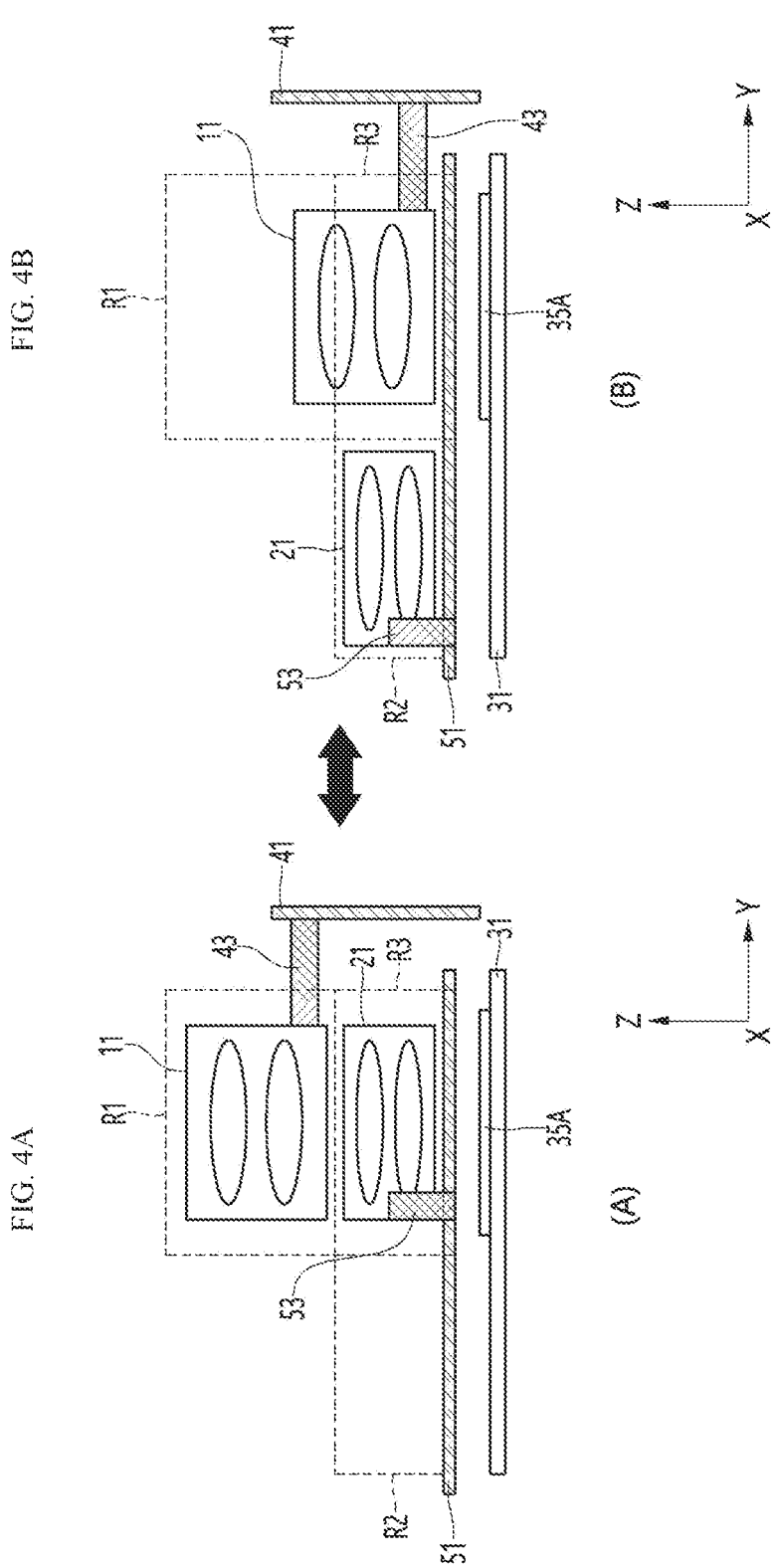
FIGS. 4A and 4B are an example driven by the driving means of the camera module of FIG. 2.

FIG. 1 is an exploded perspective view of a camera module according to a first embodiment of the invention, FIG. 2 is an example of a side cross-sectional view in which first and second lens groups of the camera module of FIG. 1 are coupled, and FIG. 3 is an example of a side cross-sectional view showing an example of driving the first lens group and the second lens group in the camera module of FIG. 2, FIGS. 4A and 4B are views showing an example driven by the driving means of the camera module of FIG. 2, and FIGS. 5 to 7 are a view showing a driving example according to another example of the driving means of FIGS. 4A and 4B.

Referring to FIGS. 1 to 4B, the camera module may include a first holder 11 having a plurality of first lens groups 212 and 232, a second holder 21 having a plurality of second lens groups 214 and 234, and an image sensor module 30 that converts light incident through the first lens group 212 and 232 and the second lens group 214 and 234 into an electrical signal. The camera module may include a module having a plurality of lens modules 210 and 230 and a plurality of image sensors 35 and 35A. The image sensor module 30 may include a printed circuit board 31 on which the plurality of image sensors 35 and 35A are disposed.

A housing (not shown) may be further disposed outside the first holder 11 and the second holder 21. Such a housing may include a space that can cover the movement of the first holder 11 in the optical axis direction and a space that can cover the movement of the second holder 21 in the horizontal direction. The first holder 11 may be a first lens barrel for supporting and receiving the plurality of first lens groups 212 and 232. The second holder 21 may be a second lens barrel for supporting and receiving the plurality of second lens groups 214 and 234. In the driving or shooting mode, as shown in FIG. 2, the first holder 11 is disposed on the second holder 21, and accordingly, the first holder 11 and the second holder 21 may overlap in the vertical direction. In the non-driving or non-shooting mode, as shown in FIG. 3, the first holder 11 is disposed on the side surface of the second holder 21, and accordingly, the first holder 11 and the second holder 21 may be overlapped in the horizontal direction.

The plurality of lens modules 210 and 230 may include a first lens module 210 and a second lens module 230 that are aligned along different optical axes and are spaced apart in the first direction X. Here, in the driving mode, the first lens module 210 may include a 1-1 lens group 212 and a 2-1 lens group 214 aligned with the first optical axis. In the driving mode, the second lens module 230 may include a 1-2 lens group 232 and a 2-2 lens group 234 aligned along the second optical axis. The plurality of first lens groups 212 and 232 disposed on the first holder 11 may be spaced apart from each other by a first interval. The plurality of second lens groups 214 and 234 disposed on the second holder 21 may be spaced apart from each other at a first interval. The plurality of first lens groups 212 and 232 may include a 1-1 lens group 212 and a 1-2 lens group 232 spaced apart in the first direction X. The plurality of second lens groups 214 and 234 may include a 2-1 lens group 232 and a 2-2 lens group 234 spaced apart from each other in the first direction X. The first and second holders 11 and 21 may be non-magnetic. The first and second holders 11 and 21 may be made of metal or plastic, and in the case of the metal material, it may block electromagnetic interference noise, and in the case of the plastic material, it can reduce weight and may be easily combined with the lens.

Figure 22:
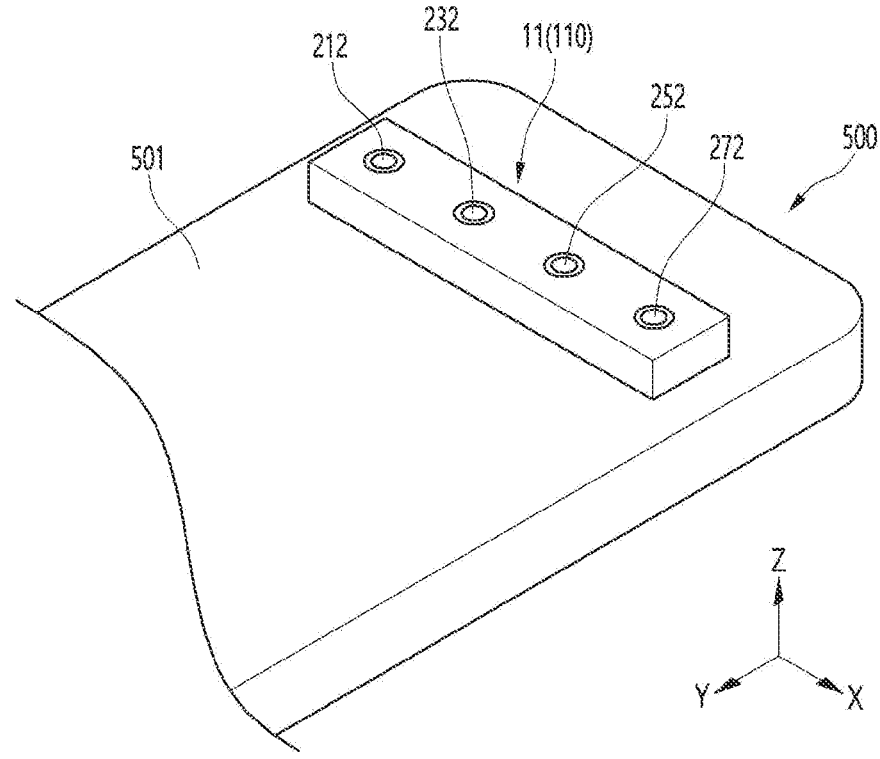
FIGS. 22 to 24 are examples of a mobile terminal having a camera module according to an embodiment(s) of the invention.
Figure 23:
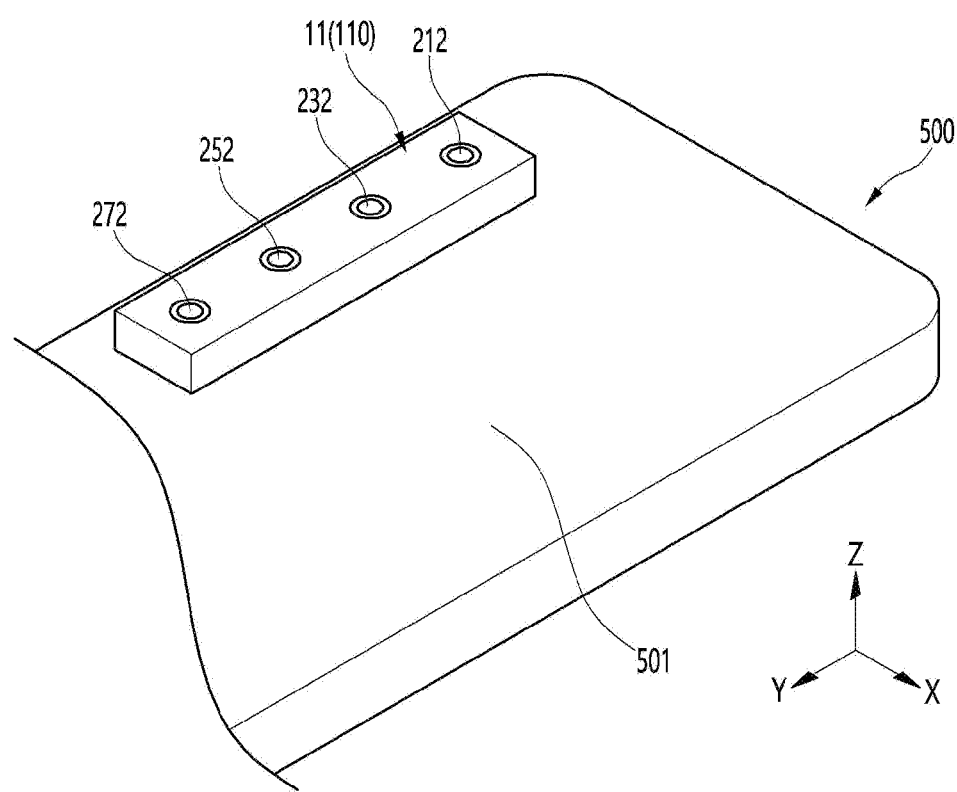
Figure 24:
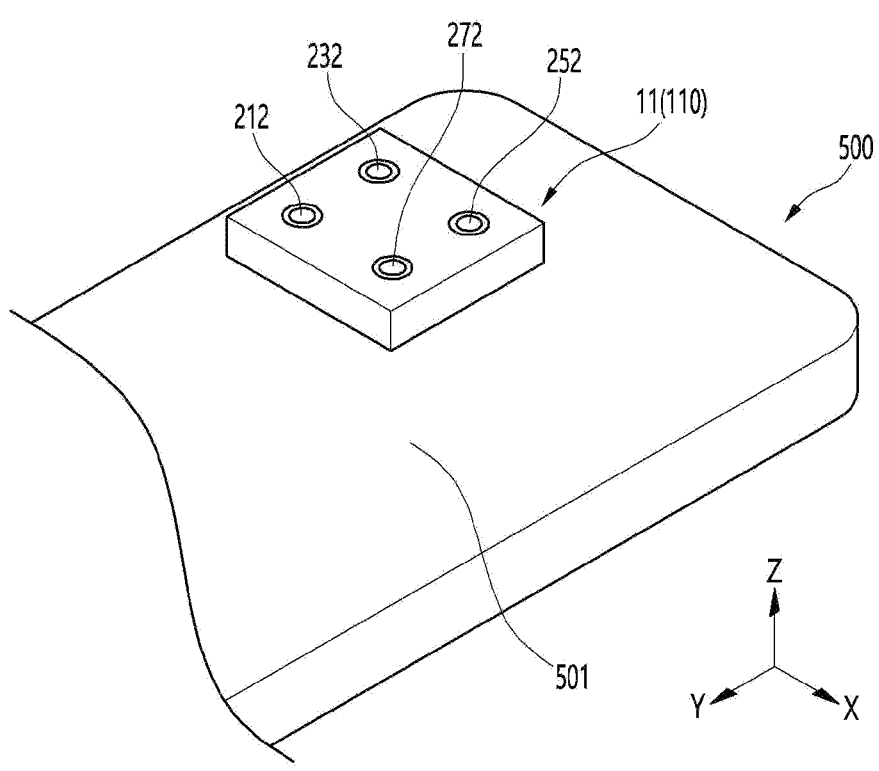

The length of the first holder 11 in the first direction X may be the same as or different from the length of the second holder 21 in the first direction X. The length of the first holder 11 in the second direction Y may be the same as or different from a length of the second holder 21 in the second direction Y. Each of the first and second holders 11 and 21 may have a length in the first direction X greater than a length in the second direction Y. Here, the first direction X may be a direction in which the lens modules 210 and 230 are arranged, and the second direction Y may be a direction orthogonal to the first direction X. For example, as shown in FIG. 22, when the camera is disposed in the case 501 of the terminal, the length in the first direction X may be longer than the length in the second direction Y. As shown in FIG. 23, when the camera is disposed in the terminal, the length in the second direction Y may be longer than the length in the first direction X. As shown in FIG. 24, when the camera is disposed in the terminal, the lengths of the first direction X and the second direction Y may be the same or different from each other.

As shown in FIG. 1, the first holder 11 and the second holder 21 may not be physically connected to each other. The first holder 11 and the second holder 21 may not be electrically connected to each other. In the driving mode, the first holder 11 may protrude more than 4 mm to the outside of the case of the terminal. The image sensor module 30 may be disposed under the first and/or second lens groups 11 and 21. The image sensors 35 and 35A may include, for example, a first image sensor 35 and a second image sensor 35A spaced apart in the first direction X.

In the first lens module 210, in the 1-1 lens group 212, three or four lenses are stacked from the object side toward the sensor side, and the 2-1 lens group 214 includes three to five lenses. The lenses may be stacked from the object side to the sensor direction. The first lens module 210 may include six to nine lenses, and may include solid lenses or at least one liquid lens between the solid lenses. The liquid lens may be disposed on at least one or both of the plurality of second lens groups. Such a liquid lens has a cavity having a conductive liquid and a non-conductive liquid therein, and an interface between the two liquids may be controlled to be concave, flat, or convex by controlling the power applied.

In the second lens module 230, in the 1-2 lens groups 232, three or four lenses are stacked from the object side toward the sensor side, and the 2-2 lens group 234 includes three to five lenses. The lenses may be stacked from the object side to the sensor direction. The second lens module 230 may include six to nine lenses, and may consist of solid lenses, or at least one liquid lens may be disposed between the solid lenses. Here, in the driving mode, the maximum distance between the two lenses most may be spaced apart between the lens of the first holder 11 and the lens of the second holder 21 facing each other may be 4 mm or more, for example, in the range of 4 mm to 9 mm. Here, the maximum distance is a mode in which the first lens groups 212 and 232 of the first and second lens modules 210 and 230 are moved (Pop-up) in the optical axis direction from the second lens groups 214 and 234, and a distance between the first holder 11 and the second holder 21 may be the maximum.

In this way, the plurality of lens modules 210 and 230, as shown in FIGS. 2 and 3, in the driving mode, the first holder 11 and the second holder 21 are vertically separated, and in the non-driving mode, the first holder 11 and the second holder 21 may be separated in a horizontal direction. Therefore, in the driving mode, the first holder 11 having the plurality of first lens groups 212 and 232 is moved by optimizing the distance between the two adjacent lenses, and the plurality of first lens groups 212 and 232 may be aligned with the optical axis of each of the second lens groups 214 and 234 in pop-up state.

In the driving mode, the 1-1 lens group 212 and the 2-1 lens group 214 of the first lens module 210 may overlap the first image sensor 35 in a vertical direction. The 1-2 lens group and the 2-2 lens group 234 of the second lens module 230 may vertically overlap the second image sensor 35A. In the non-driving mode, the first holder 11 vertically overlaps the first and second image sensors 35 and 35A, and the second holder 21 may not overlap the first and second image sensors 35 and 35A in the vertical direction. Here, in the first example, the printed circuit board 30 is separated from the second holder 21 and only the second holder 21 may be moved in the horizontal direction, and the first and second image sensors 35 and 35A may be positioned in a state aligned with the optical axis of the first lens group 212 and 232 in a state before or after movement. In the first example, since the printed circuit board 30 is fixed, it may be advantageous in terms of structure and space. In another second example, the printed circuit board 30 is connected to the second holder 21, the printed circuit board 30 and the second holder 21 may be moved together, and the first and second images sensors 35 and 35A may be positioned in a state aligned with the optical axis of the second lens group 214 and 234 before or after movement. As in the second example, when the printed circuit board 30 and the second holder 21 are moved together, the number of cases in which the optical axis is considered may be reduced, so that the optical performance may be improved.

The first image sensor 35 may convert the light incident through the first lens module 210 into an electrical signal. The second image sensor 35A may convert the light incident through the second lens module 230 into an electrical signal. The image sensors 35 and 35A may be any one of a charge coupled device (CCD), a complementary metal-oxide semiconductor (CMOS), a CPD, and a CID. Any one of the image sensors 35 and 35A may be a color (RGB) sensor, and the other may be a black and white sensor.

The first and second image sensors 35 and 35A may be disposed on one printed circuit board 31. The ratio of the length of the long side to the length of the short side in the first and second image sensors 35 and 35A may be 4:3 or 16:9. The printed circuit board 31 may include an FPCB. An optical filter may be disposed on the image sensors 35 and 35A. A first optical filter (not shown) may be disposed on the first image sensor 35, and the first optical filter may be disposed inside the second holder 21. The first optical filter may be disposed between the 2-1 lens group 214 of the second holder 21 and the first image sensor 35. The first optical filter may be an infrared filter, and may block light in the infrared region from being incident on the first image sensor 35. A second optical filter (not shown) may be disposed on the second image sensor 35A, and the second optical filter may be disposed inside the second holder 21. The second optical filter may be disposed between the 2-2 lens group 234 of the second holder 21 and the second image sensor 35A. The second optical filter may be an infrared filter, and may block light in the infrared region from being incident on the second image sensor 35A. The first and second optical filters may be formed by coating an infrared blocking coating material on a plate-shaped optical filter such as a cover glass for protecting an imaging surface or a coverglass. The first and second optical filters may be an infrared absorption filter or an infrared reflection filter.

The lens of the first lens module 210 and the lens of the second lens module 230 may have different Fno (F number). The first and second lens modules 210 and 230 may generate an image having a difference in image brightness or image quality. For example, one of the first and second lens modules 210 and 230 may be a wide-angle or telephoto lens module, and the other may be a main or general lens module. The wide-angle lens module may photograph a subject having a wider width than that of the main lens module. The telephoto lens module may photograph a subject at a distance compared to a standard lens module. Any one of the first and second lens modules 210 and 230 may be an ultra-wide-angle lens module. The ultra-wide-angle lens module may be provided with an angle of view wider than that of the wide-angle lens module, for example, the angle of view of the wide-angle lens module may be 45 degrees or more or the range of 45 degrees to 90 degrees, and the angle of view of the ultra-wide lens module may be 120 degrees or more. Since the lens modules of various functions are mounted in the camera module, it is possible to improve user convenience and improve the quality of a photographed image. The first lens module 210 may have a focal length of 3 mm or more, for example, in a range of 3 mm to 10 mm. The second lens module 230 may be greater than the focal length of the first lens module 210, and may be 10 mm or more, for example, 10 mm to 14 mm. As another example, the sizes of the first image sensor 35 and the second image sensor 35A may be different from each other.

As shown in FIG. 2, in the driving mode, the first holder 11 and the second holder 21 may overlap the image sensors 35 and 35A in a vertical direction. As shown in FIG. 3, when the non-driving mode is switched, the second holder 21 may move in the horizontal direction M1, and the first holder 11 may move in the sensor direction M2. Here, when switching from the driving mode to the non-driving mode, the first holder 11 may be moved from the first region R1 exposed to the outside of the case of the terminal toward the third region R3, and the second holder 21 may be moved from the third region R3 toward the second region R2 spaced apart in the horizontal direction. Accordingly, in the driving mode, the first and second holders 11 and 21 overlap in the vertical direction, and in the non-driving mode, the first and second holders 11 and 21 may overlap in the horizontal direction, so that the height of the camera module may be reduced. Here, the thickness of the first and second holders 11 and 21 on the printed circuit board 31 before the pop-up may be 5 mm or less, and the total thickness after the pop-up of the first holder 11 may be in the range of 10 mm+1 mm. Here, before or after driving, the difference in height of the first holder 11 may be about ½ of the thickness of the first holder 11. By providing a long total length (TTL) of the camera module with the thickness due to the pop-up state, optical performance may be improved. Here, based on an optical system having the longest length among the plurality of lens modules, for example, a telephoto lens module, the lenses of the first lens group and the lenses of the second lens group may be distinguished. Alternatively, the lenses of the first lens group and the lenses of the second lens group may be distinguished based on the TTL of the optical system having the largest image sensor. The camera device may include a plurality of driving means and a control portion to drive each of the first holder 11 and the second holder 21. The plurality of driving means may include a first driving means (not shown) for driving the first holder 11 in a vertical direction, and a second driving means (not shown) for driving the second holder 21 in a horizontal direction. Each of the first and second driving means may include at least one of a piezo member, an actuator, or a stepping motor. As another example, the driving means may include a plurality of leaf springs, and may provide elasticity in a vertical direction through the leaf springs. As another example, a hall sensor may be disposed on at least one of the first and second holders 11 and 21, and the hall sensor may detect movement in a vertical direction.

As shown in FIGS. 4A and 4B, the first driving means may include a first guide shaft 41, a first moving portion 43 connected to the first guide shaft 41 and the first holder 11, and a first driving portion (not shown) for flowing the first moving portion 43 through the first guide shaft 41. The second driving means may include a first guide shaft 51, a second moving portion 53 connected to the second guide shaft 51 and the second holder 21, and a second driving portion (not shown) for moving the second moving portion 53 through the second guide shaft 51. The first and second driving portions may be implemented as a piezo member or a stator such as a coil. The piezo member is stretched or contracted when a voltage is applied to transmit flow to the first and second guide shafts 41 and 51. The first guide shaft 41 extends along the first and third regions R1 and R3 in the vertical direction, is connected to the outside of the first holder 11, and may be arranged in one or a plurality. The second guide shaft 51 extends along the second and third regions R2 and R3 in the horizontal direction, is connected to the outside of the second holder 21, and may be arranged in one or a plurality. The first guide shaft 41 and the second guide shaft 51 may be disposed in a direction perpendicular to each other. The first moving portion 43 may be vertically moved along the first guide shaft 41 together with the first holder 11. The second moving portion 53 may be moved in the horizontal direction along the second guide shaft 51 together with the second holder 21. The first holder 11 and the second holder 21 may be moved at the same time. The moving distance of the first holder 11 may be shorter than the moving distance of the second holder 21.

Figure 5:
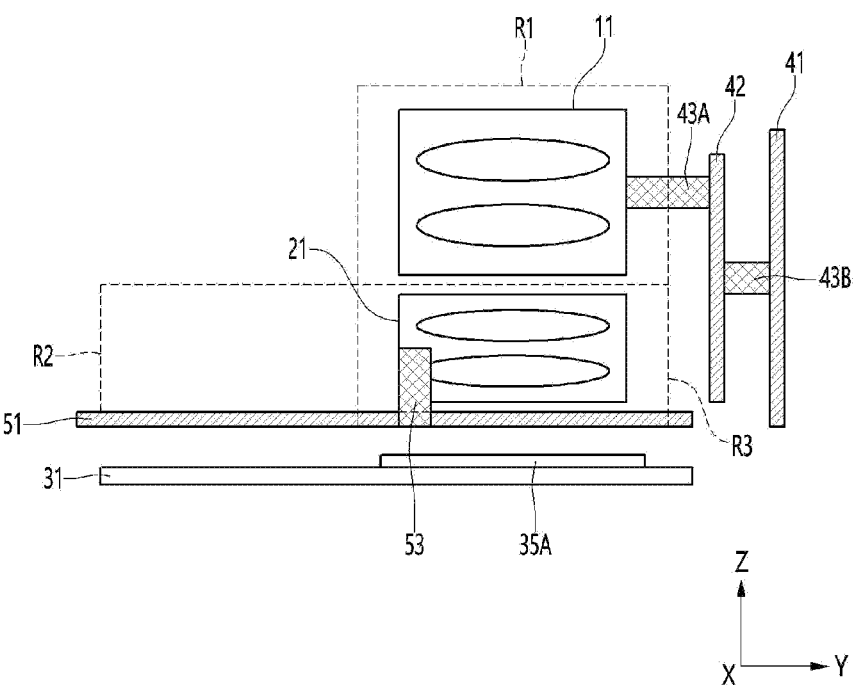
FIGS. 5 to 7 are driving examples according to another example of the driving means of FIGS. 4A and 4B.
Figure 6:
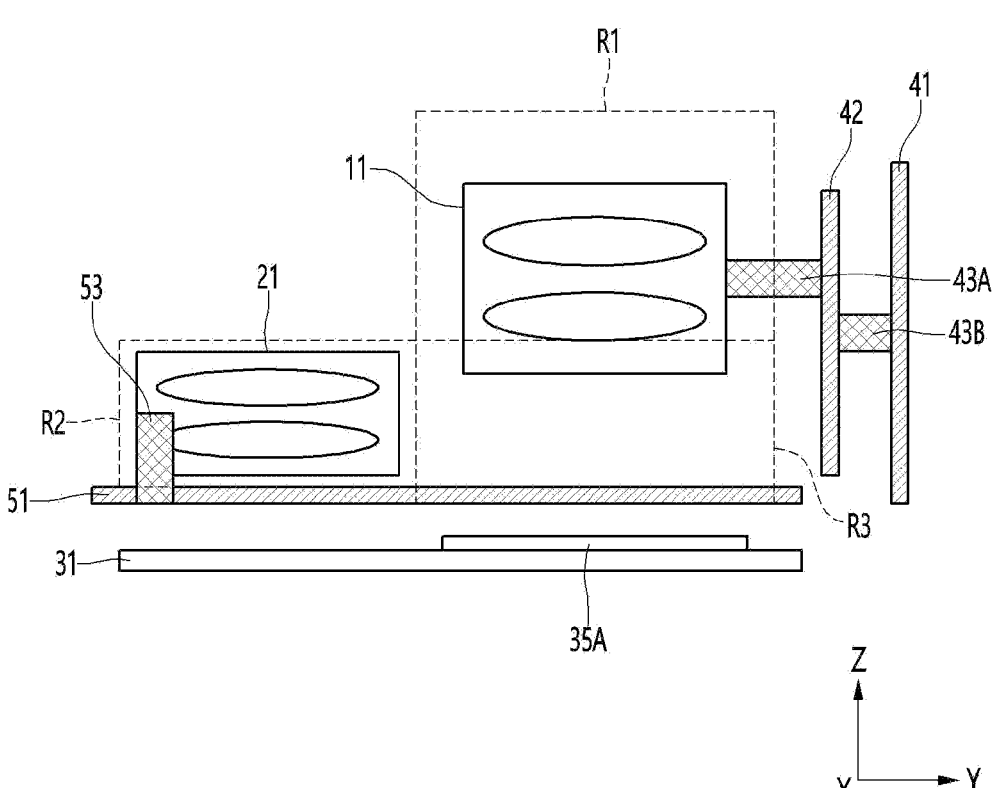
Figure 7:
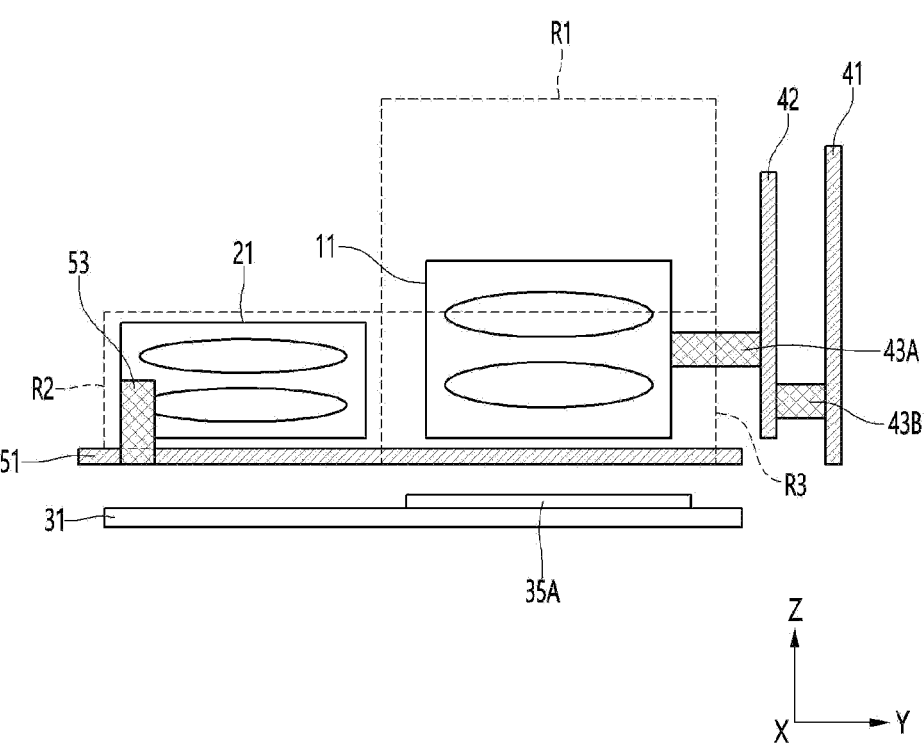
Figure 8:
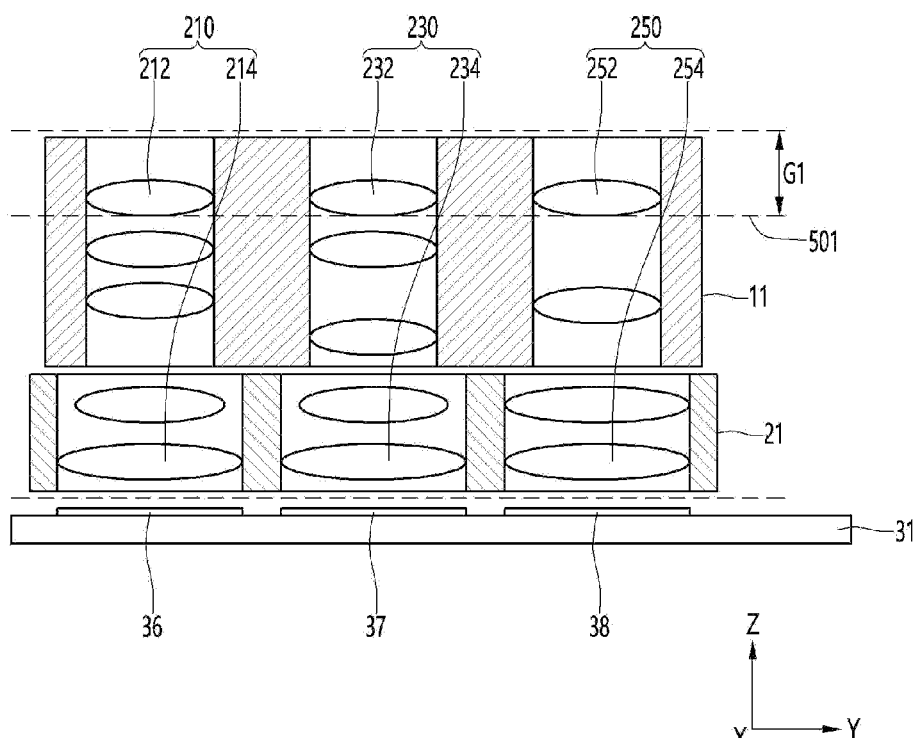
FIG. 8 is a side cross-sectional view illustrating a driving state of a camera module according to a second embodiment.

As shown in FIGS. 5 to 7, it is a configuration showing another example of the first driving means. The first driving means may include a first guide shaft 41, an intermediate guide shaft 42, a first connection portion 43A, and an intermediate connection portion 43B. The first guide shaft 41 and the intermediate guide shaft 42 may move the first holder 11 in an up or down direction in multiple stages. By moving the first holder 11 in such a multi-stage manner, the height of the fixed first guide shaft 41 may not be increased. Specifically, as shown in FIGS. 5 to 7, the intermediate guide shaft 42 is disposed inside the first guide shaft 41, that is, in a region adjacent to the first holder 11. The upper end of the intermediate guide shaft 42 may be moved from a position higher than the upper end of the first guide shaft 41 to a lower position.

As shown in FIG. 5, when the intermediate guide shaft 42 may be driven by the third driving portion, the first connection portion 43A and the first holder 11 may be moved in the down direction, and then in the state as shown in FIG. 6, when the first holder 11 is disposed on the upper portion of the third region R3, the first guide shaft 41 is driven by the first driving portion, and accordingly, the intermediate connection portion 43B connected to the first guide shaft 41 may move the first holder 11 toward the lower portion of the third region R3 or the sensor. Accordingly, as shown in FIG. 7, the first guide shaft 41 and the intermediate connection portion 43B may position the first holder 11 closest to the image sensors 35 and 35A. The third driving portion may include a piezo member.

FIGS. 8 to 13 are diagrams illustrating a camera module according to a second embodiment, and a detailed description of the same configuration as that of the first embodiment will be omitted.

Referring to FIGS. 8 to 11, the camera module may include a triple lens module. The camera module may include the first and second holders 11 and 21 and first to third lens modules 210, 230, and 250 aligned with different optical axes. The camera module may include first to third image sensors 36, 37, and 38 disposed on one printed circuit board 450. The first holder 11 may include three or more first lens groups 212, 232, and 252. The second holder 21 may include three or more second lens groups 214, 234, and 254. The first holder 11 may include a 1-1 lens group 212, a 1-2 lens group 232, and a 1-3 lens group 252, and the second holder 21 may include a 2-1 lens group 214, a 2-2 lens group 234, and a 2-3 lens group 254. The first lens module 210 vertically overlaps with the first image sensor 36, the second lens module 230 vertically overlaps with the second image sensor 37, and the third lens module 250 may vertically overlap the third image sensor 38. A filter (not shown) may be disposed on each of the first to third image sensors 36, 37, and 38. The first to third image sensors 36, 37, and 38 may be disposed on one printed circuit board 31 to be spaced apart from each other. The first lens module 210 may be a wide-angle lens module, the second lens module 230 may be a main or general lens module, and the third lens module 250 may be a telephoto lens module. Here, the Fno of the telephoto lens module may be 1.8 or less. Any one of the first to third lens modules 210, 230, and 250 may be implemented as an ultra-wide-angle lens module. The ultra-wide-angle lens module may be provided with an angle of view wider than that of the wide-angle lens module, for example, the angle of view of the wide-angle lens module may be 45 degrees or more or the range of 45 degrees to 90 degrees, and the angle of view of the ultra-wide lens module may be 120 degrees or more. By mounting lens modules of various functions in the housing 100, user convenience may be improved and the quality of a photographed image may be improved.

The first lens module 210 may have a focal length of 3 mm or more, for example, in a range of 3 mm to 10 mm. The second lens module 230 may be greater than the focal length of the first lens module 210, and may be 10 mm or more, for example, in a range of 10 mm to 14 mm. The third lens module 250 may have a focal length of 10 mm or more, for example, in a range of 10 mm to 14 mm. The first to third lens modules 210, 230, and 250 may have different focal lengths or adjust the sizes of the first to third image sensors 36, 37, and 38 to improve image quality in a desired shooting mode. In this case, the distance between the lens groups of the telephoto lens module having the largest focal length among the lens modules may be set as a reference, and then the distance between the lens groups of the other lens modules may be set. The first and second holders 11 and 21 may have a length in one direction X greater than or equal to a length in the other direction. For example, as shown in FIGS. 22 to 24, the camera module may be disposed under the case 501 of the terminal, and may protrude when the first holder having the first lens group is in the driving mode.

The plurality of first lens groups 212, 232, and 252 disposed in the first holder 11 may be disposed to be spaced apart from each other at a first interval. The plurality of second lens groups 214, 234, and 254 disposed on the second holder 21 may be disposed to be spaced apart from each other at a first interval. The plurality of first lens groups 212, 232, and 252 may include a 1-1 lens group 212, a 1-2 lens group 232, and a 1-3 lens group 252 spaced apart from each other in the first direction. The plurality of second lens groups 214, 234, and 254 may include a 2-1 lens group 214, a 2-2 lens group 234, and a 2-3 lens group 254 spaced apart from each other in the first direction. Here, the first lens module 210 may include a 1-1 lens group 212 and a 2-1 lens group 214 aligned along a first optical axis. The second lens module 230 may include a 1-2 lens group 232 and a 2-2 lens group 234 aligned along a second optical axis. The third lens module 250 may include a 1-3 lens group 252 and a 2-3 lens group 254 aligned along a third optical axis.

In the first lens module 210, in the 1-1 lens group 212, three or four lenses are stacked from the object side toward the sensor side, and the 2-1 lens group 214 includes three to five lenses. The lenses may be stacked from the object side to the sensor direction. The first lens module 210 may include six to nine lenses, and may be made of solid lenses, or may include at least one liquid lens between the solid lenses, wherein the liquid lens supplies power. In consideration of this, it may be disposed in the second holder. In the second lens module 230, in the first and second lens groups 232, three or four lenses are stacked from the object side toward the sensor side, and the 2-2 lens group 234 includes three to five lenses. Lenses may be stacked from the object side toward the sensor side. The second lens module 230 may include six to nine lenses, and may consist of solid lenses, or at least one liquid lens may be disposed between the solid lenses. In the third lens module 250, in the 1-3 lens group 252, two or three lenses are stacked from the object side toward the sensor side, and the 2-3 lens group 254 includes three to five lenses. The lenses may be stacked from the object side to the sensor direction. The third lens module 250 may include five to eight lenses, and may consist of solid lenses, or at least one liquid lens may be disposed between the solid lenses.

Figure 9:
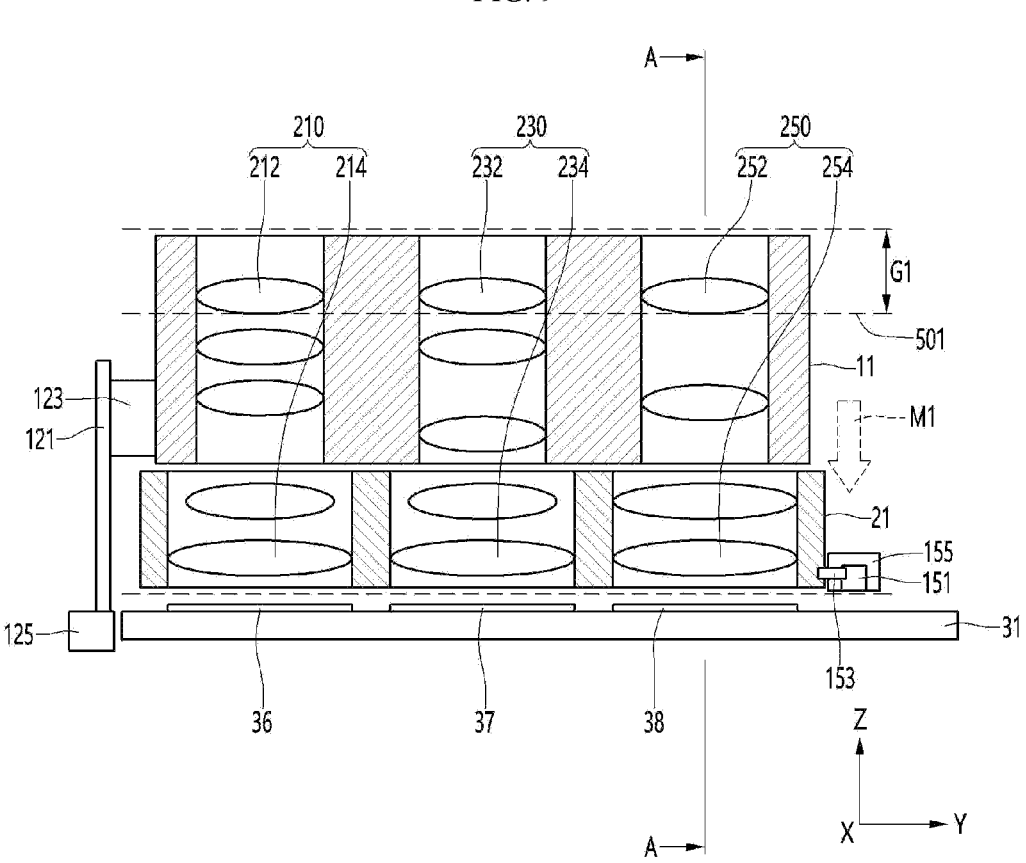
Figure 10:
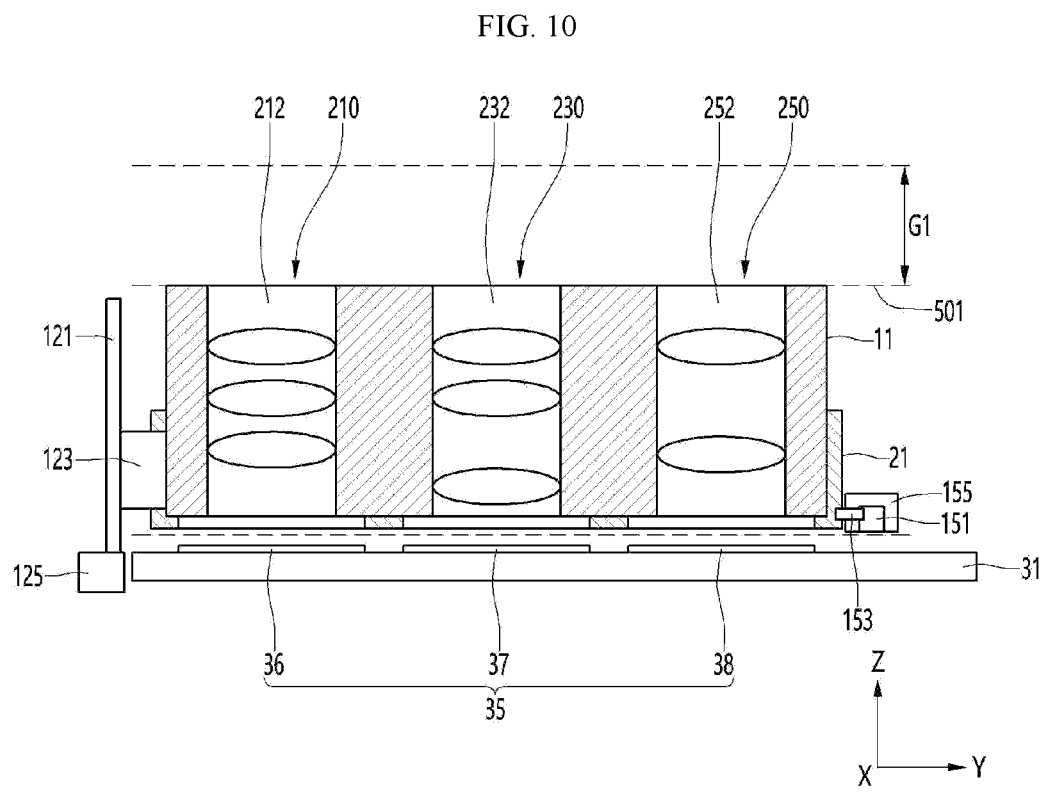
Figure 11:
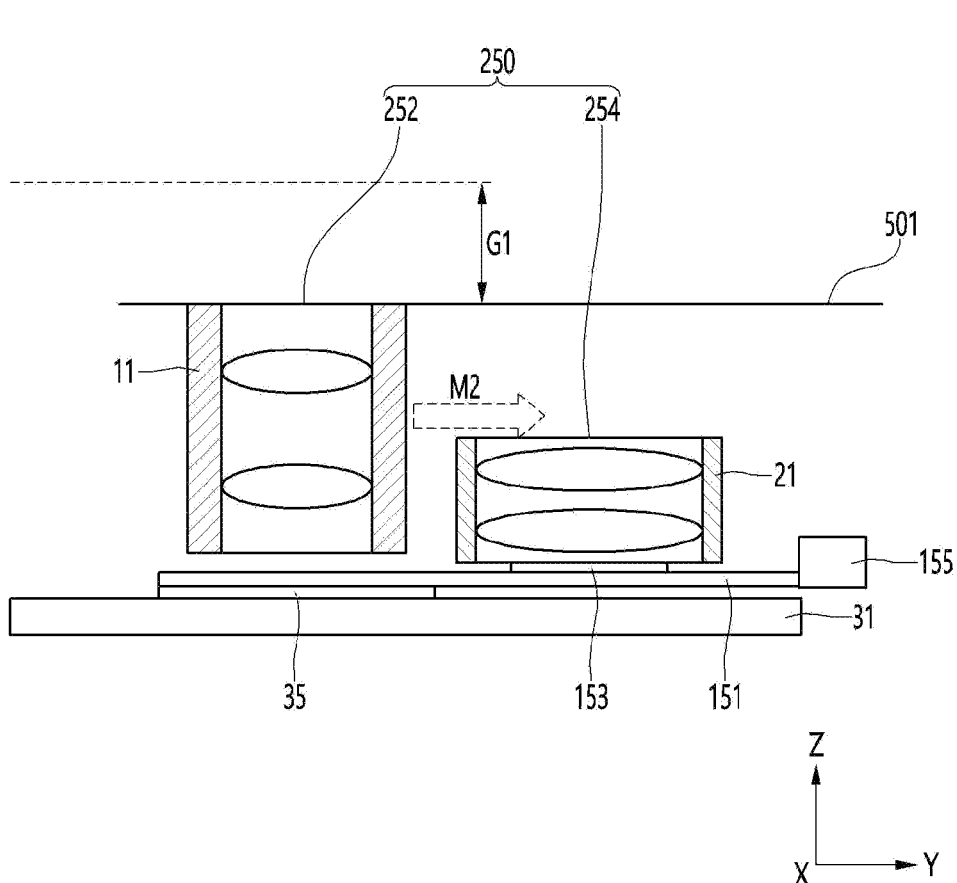

As shown in FIGS. 9 to 11, the first holder 11 is driven by a first driving means, the first driving means may include a first guide shaft 121 disposed outside the first holder 11, a first connection portion 123 connected to the first guide shaft 121 and the first holder 11, and a first driving portion 125 for driving the first guide shaft 121. The second holder 21 is driven by a second driving means, and the second driving means may include a second guide shaft 151 disposed outside the moving distance of the second holder 21, a second connection portion 153 connected to the second guide shaft 151 and the second holder 21, and a first driving portion 155 for driving the second guide shaft 151. The first and second driving portions 125 and 155 may be a piezo member, and as another example, may be implemented as an actuator or a stepping motor. One or a plurality of the first driving means may be arranged to stably raise or lower the first holder 11 in the vertical direction. One or a plurality of the second driving means may be arranged to move the second holder 21 up or down in the horizontal direction.

When the state shown in FIG. 10 is switched to FIG. 9, it is a driving mode, and the first holder 11 is lifted up in the vertical direction M2 by the first driving means 121, 123, and 125, and the second holder 21 may be moved toward the sensor in the horizontal direction M1 by the second driving means 151, 153, and 155. When the state as shown in FIG. 9 is switched to the state of FIG. 10, it is in a non-driving mode, and the first holder 11 is down in the vertical direction M2 by the first driving means 121, 123, 125, and the second holder 21 may be moved away from the sensor in the horizontal direction M1 by the second driving means 151, 153, and 155. Accordingly, the moving distance G1 of the first holder 11 may be moved by 4 mm or more. Here, in the driving mode, the maximum distance between the two lenses most spaced apart between the lens of the first holder 11 and the lens of the second holder 21 may be 4 mm or more, for example, it may be in the range of 4 mm to 9 mm. Here, the maximum distance is a distance in a mode (Pop-up) in which the first lens groups 212, 232, and 252 of the first to third lens modules 210, 230, and 250 are moved higher than the surface of the case 501 in the optical axis direction from the second lens groups 214, 234, and 254, the distance between the first holder 11 and the second holder 21 may be the maximum. Here, the moving distance G1 of the first holder 11 may be about ½ of the thickness of the first holder 11. A distance between two adjacent optical axes among the first to third optical axes of the first to third lens modules 210, 230, and 250 may be constant or one of them may be larger, but the invention is not limited thereto. As another example, a quadruple lens module may be included in the first and second holders 11 and 21. The quadruple lens module may be a first to fourth lens module, and may include the first to third lens modules 210, 230, and 250 disclosed above and a lens module for Time of Flight (ToF) (e.g., 272 in FIGS. 22-24). Such a TOF lens module and image sensor may provide a depth data along with two-dimensional data. Alternatively, a ToF lens module may be applied as the third lens module 250. When such a ToF lens module is applied, the camera device may include an infra-red element.

Figure 12:
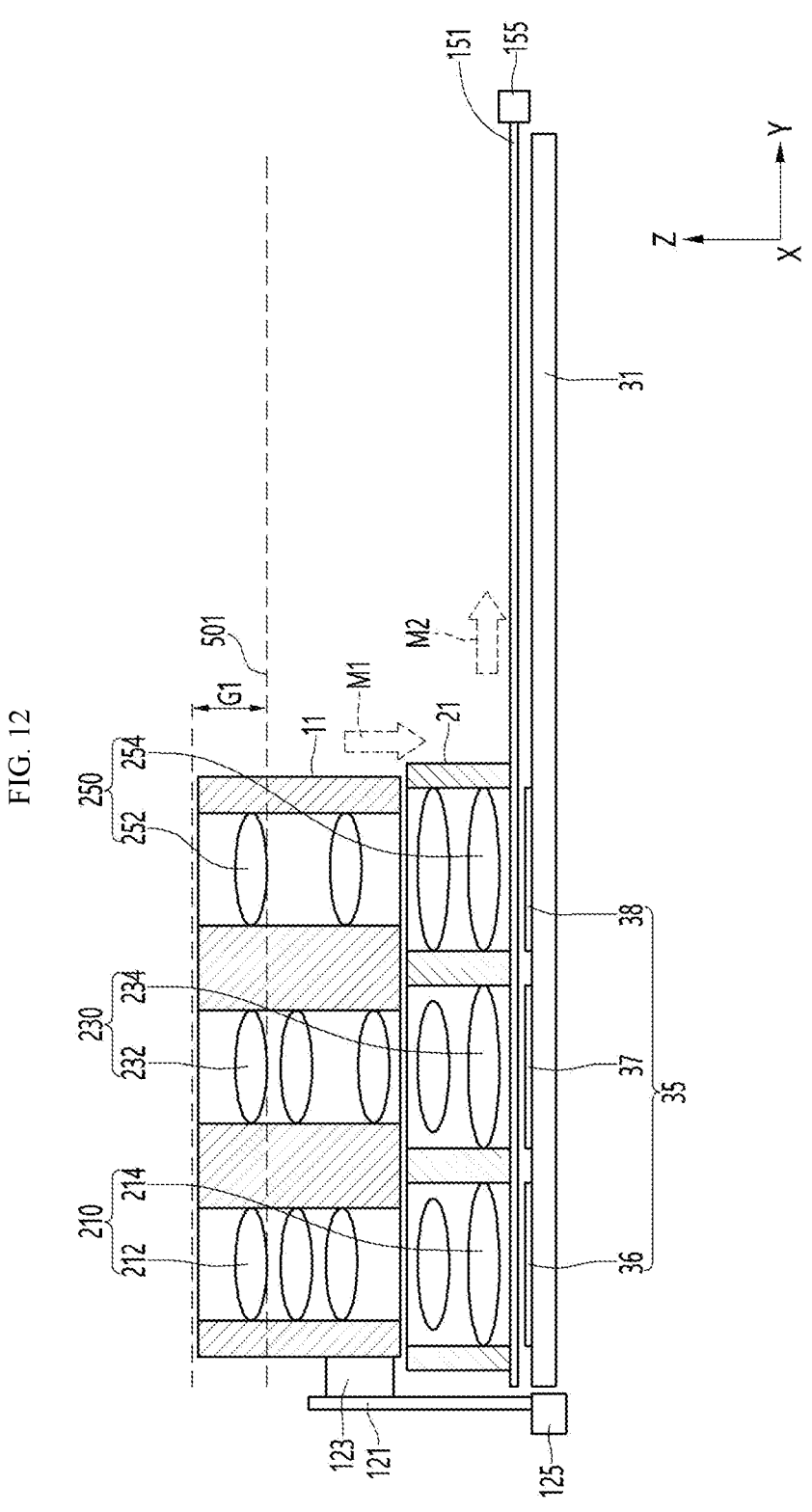
FIGS. 12 and 13 are other driving examples of the lens group of the camera module of FIG. 8.
Figure 13:
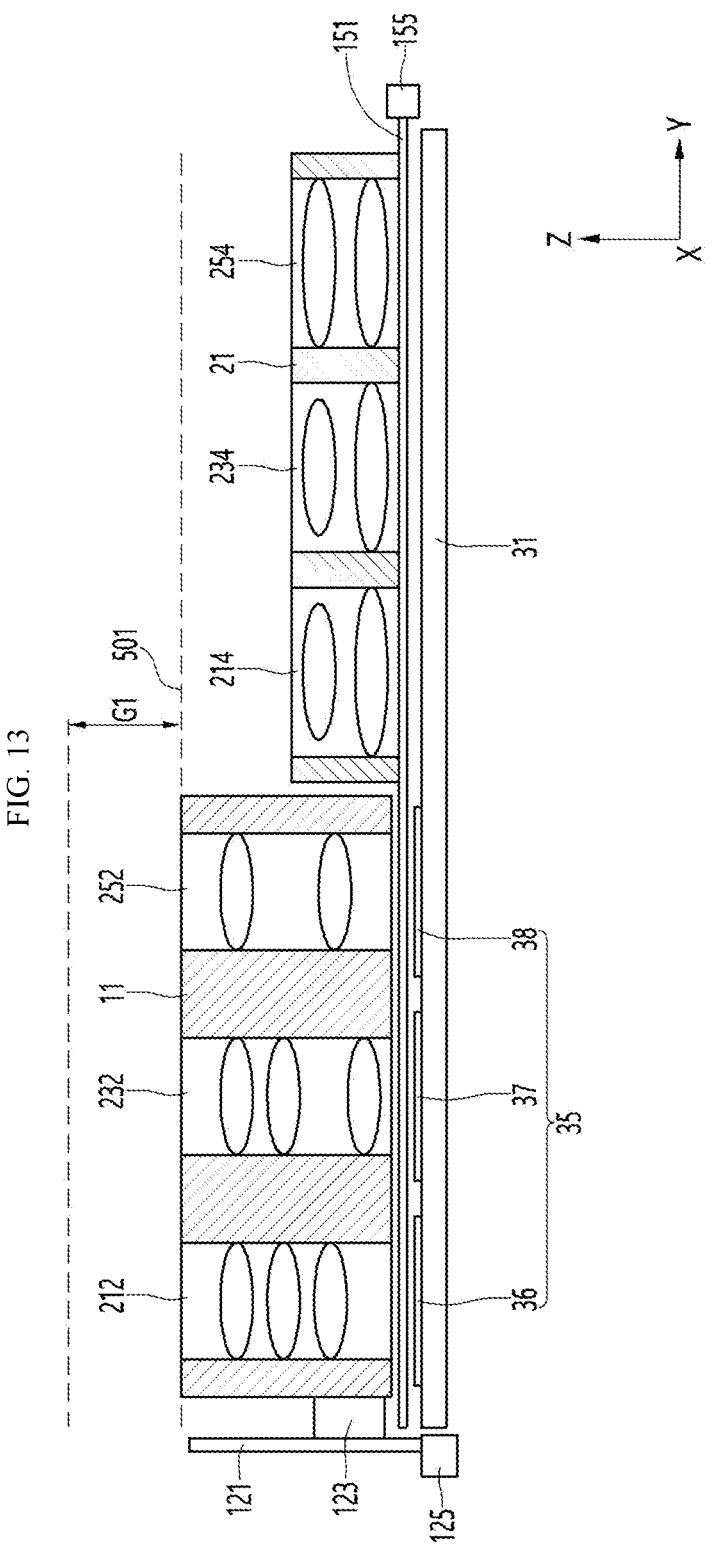

In FIGS. 8 to 11, an example has been described in which the second holder 21 moves in a direction orthogonal to a direction in which the plurality of lens modules 210, 230, and 250 is disposed, that is, in a short side direction of the second holder 21. As shown in FIGS. 12 and 13, an example has been described in which the second holder 21 moves in the same direction in which the plurality of lens modules 210, 230, and 250 are disposed, that is, in the long side direction of the second holder 21. This movement of the second holder 21 may be used in the camera structure of the terminal as shown in FIGS. 23 and 24.

Figures 14A, 14B:
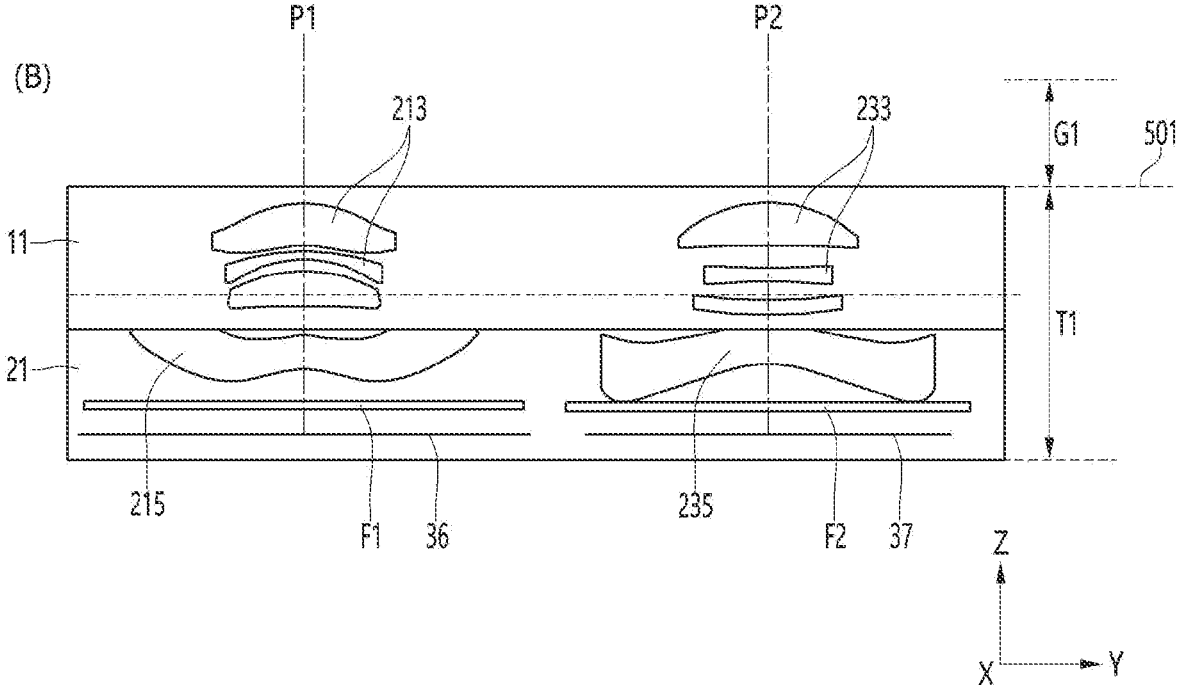
FIGS. 14A and 14B are views comparing a state after or before driving of first and second lens groups in the camera module according to the first embodiment.

As shown in FIGS. 14A and 14B, the thickness T2 of the camera module, that is, the height (i.e., T2) from the printed circuit board to the upper end of the first holder 11 may be greater than the height T1 of the receiving space of the mobile terminal. Accordingly, the first holder 11 may be moved in the up or down direction by the distance G1 obtained by the two height differences T2–T1. Here, in the driving mode, the first holder 11 may protrude to the outside of the case 501 by the distance G1, and in the non-driving mode, the first holder 11 may be moved in the down direction by the distance G1. The 1-1 lens group 213 of the first holder 11 and the 2-1 lens group 215 of the second holder 21 may be aligned with the first optical axis P1, and thus it may operate in the shooting mode. The 1-2 lens group 233 of the first holder 11 and the 2-2 lens group 235 of the second holder 21 may be aligned with the second optical axis P2, and thus it may operate in the shooting mode. Here, the filters F1 and F2 may be respectively disposed between the second holder 21 and the image sensors 36 and 37. In this camera module, the lenses of the 1-1 lens group 213 of the first lens module of the first holder 11 and the lenses of the 1-2 lens group 215 of the first lens module of the second holder 21 may be aligned from the object side towards the sensor side. The diaphragm may be located at the edge of the object-side surface of the first lens or the second lens of each of the plurality of first lens groups, and may be disposed at the edge of the object-side surface of the first lens or the second lens according to each lens module. Here, as shown in FIGS. 1, 14A, and 14B, when the first lens module 210 is the main lens module, the 1-1 lens groups 212 and 213 may be stacked in two- or three-piece lenses, and may have the total positive refractive power. For example, in the first lens module 210, the object-side lens (the lens closest to the object) and the last sensor-side lens (the lens closest to the sensor) of the 1-1 lens groups 212 and 213 may have positive refractive power. When the 1-1 lens groups 212 and 213 is two lenses, the focal length of the object-side lens may be 0.7 times or more, for example, between 0.7 and 1.5 times the total focal length of the first lens group. When the 1-1 lens group 212 and 213 are stacked with three lenses, among the lenses of the 1-1 lens group 212 and 213, the refractive power from the object-side lens to the sensor-side surface (sensor-side surface of the last lens) separated from the 2-1 lens group 214 and 215 may have a positive refractive power, and the focal length of the object-side lens may be 1.5 times or more, for example, in a range of 1.5 to 3 times the total focal length of the 1-1 lens group 212 and 213.

The 2-1 lens groups 214 and 215 of the first lens module 210 may be composed of 3 or 4 elements, the total power may have a negative refractive power, and the object side lens and the sensor side lens of the 2-1 lens group 215 may have negative refractive power. In the second lens groups 214 and 215, the focal length of the sensor-side lens may be 0.15 times or more, for example, 0.15 to 1.5 times the focal length of the total 2-1 lens group. In the 2-1 lens groups 214 and 215 of the first lens module 210, the object-side lens may have a sagittal height (Sag) value of 0.01 mm or less up to a height of 25% of the effective diameter of the lens in order to reduce the sensitivity to the lateral decenter. The total TTL (distance from the object-side lens to the sensor) of the first lens module 210 having the 1-1 lens groups 212 and 213 and the 2-1 lens groups 214 and 215 may be in a range of 90% to 100% of the thickness of the terminal on which the optical system is mounted. The thickness of the 1-1 lens groups 212 and 213 or the first holder 11 disclosed above may be 40% or less of the total optical system TTL, for example, in the range of 30% to 40%. The thickness of the 1-1 lens groups 212 and 213 or the first holder 11 may be formed in consideration of the thickness of the mobile terminal or the camera receiving space. The thickness or height of the 2-1 lens groups 214 and 215 or the second holder 21 may be provided in a range of 30% or more of the total optical system TTL, for example, 30% to 60%. In the driving mode, the distance between the 1-1 lens group 212 and 213 or the first holder 11 and the 2-1 lens group 214 and 215 or the second holder 21 is 20% or less of the total optical system, such as in the range of 10% to 20%.

When the second lens module 230 is a telephoto lens module, the first and second lens groups 232 and 233 may be composed of three lenses, the total power has a positive refractive power, and the object-side lens and the sensor-side lens may have positive refractive power. The focal length of the object-side lens of the first and second lens groups 232 and 233 may be 0.6 times or more, for example, between 0.6 and 1.5 times the total focal length of the first and second lens groups 232 and 233. Here, the diaphragm may be disposed on the object-side first lens and the object-side edge of the second lens of the first and second lens groups 232 and 233. The 2-2 lens groups 234 and 235 of the second lens module 230 may be composed of two lenses, the total power of which has a negative refractive power, and the object-side lens and the sensor-side lens have negative refractive power. The focal length of the sensor-side lens of the 2-2 lens group 234 and 235 may be 1.5 times or more, for example, 1.5 to 2.5 times the total focal length of the 2-2 lens group 234 and 235. The object-side lenses of the 2-2 lens group 234 and 235 may be configured to have a Sag (sagittal height) value of 0.01 mm or less up to 25% of the effective diameter of the lens in order to reduce the sensitivity due to the horizontal decenter.

The total TTL (length from a surface of the first lens to the sensor) of the second lens module 230 may be 90% to 100% of the thickness of the terminal to which the optical system is to be mounted, and the thickness of the holders with the 1-2 lens groups and the 2-2 lens group may be divided by the ratio of the total optical system length (TTL). For example, the thickness of the first holder 11 having the 1-2 lens groups 232 and 233 may be 40% or less of the total optical system TTL, for example, in the range of 30-40%. The thickness of the second holder 21 having the 2-2 lens groups 234 and 235 may be 60% or less of the total optical system TTL, for example, in the range of 50% to 60%. The thickness of the first and second lens groups 232 and 233 or the first holder 11 may be formed in consideration of the thickness of the mobile terminal or the space for accommodation the camera. The interval between the 1-2 lens group 232 and 233 or the first holder 11 and the 2-2 lens group 234 and 235 or the second holder 21 may be in the range of 20% or less of the total optical system, for example, in a range of 10% to 20%. As shown in FIGS. 22 to 24, the first lens groups 212, 232, and 252 of the plurality of lens modules disposed in the first holder 11 show a vertically up state, and when not driven, they may be down to the same position as the surface of the case.

Figure 15:
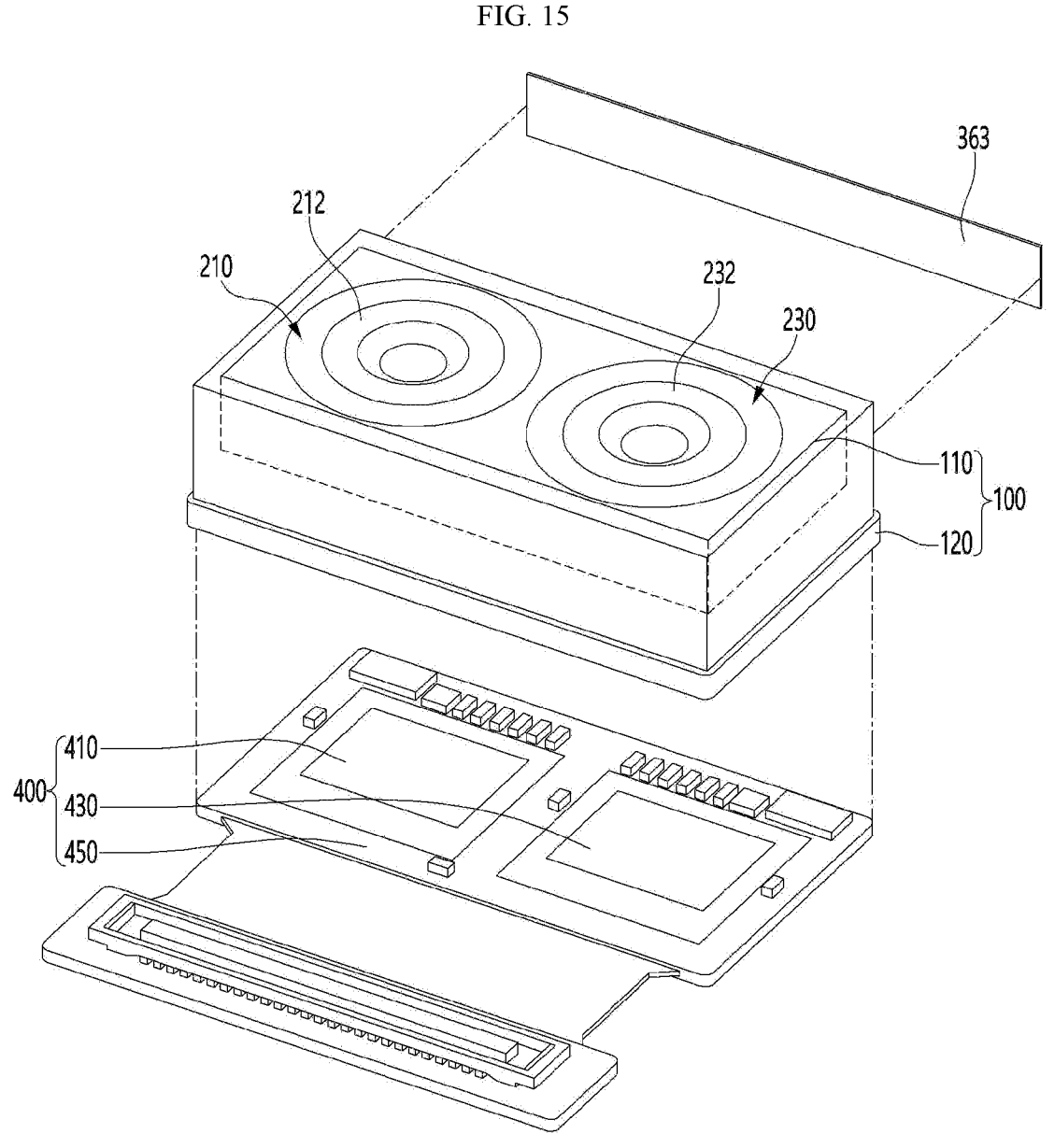
FIG. 15 is an exploded perspective view of a camera module according to a third embodiment of the invention.
Figure 16:
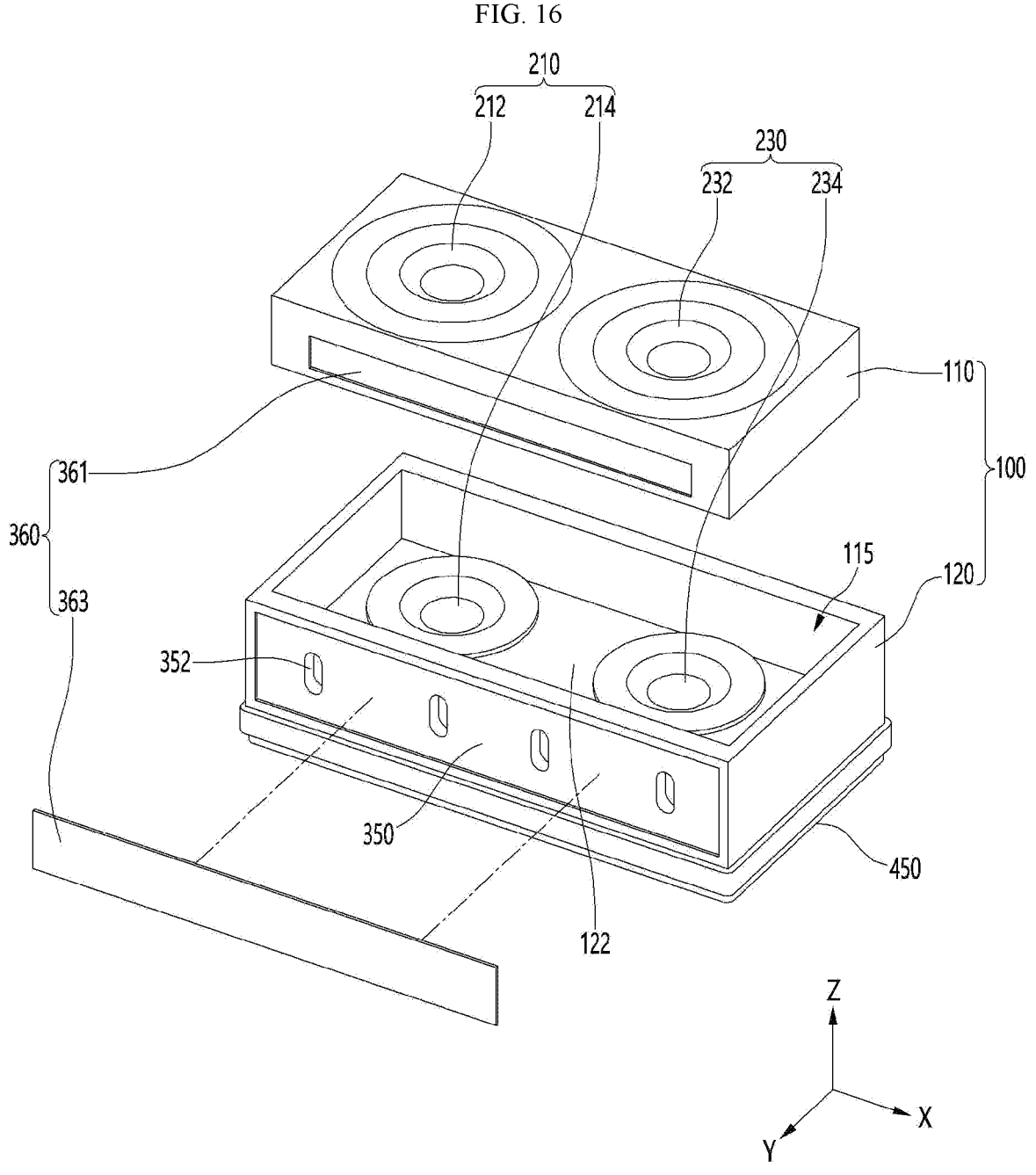
FIG. 16 is a perspective view illustrating an example of a driving portion of a camera module in FIG. 15.
Figure 17:
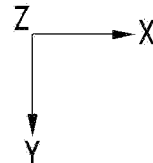
FIG. 17 is an example of a plan view illustrating first lens groups in the camera module of FIG. 15.
Figure 18A:
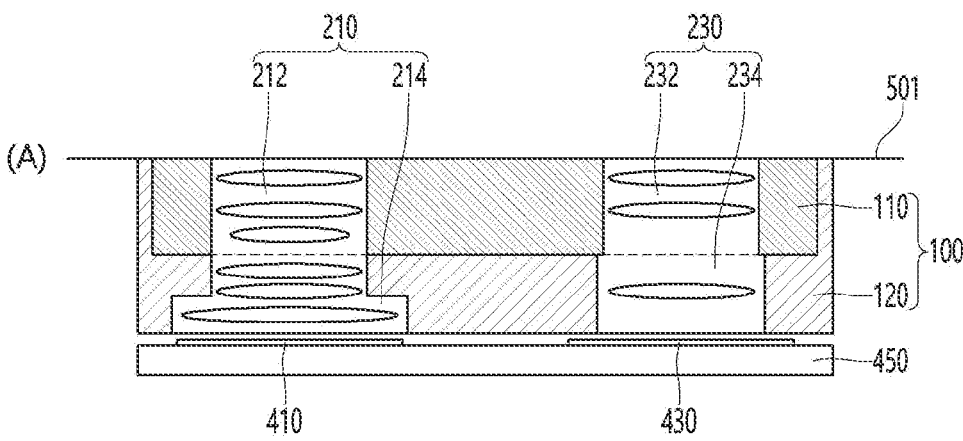
FIGS. 18A and 18B are examples of a side cross-sectional view showing a driving state or before driving of the camera module according to the third embodiment.
Figure 18B:
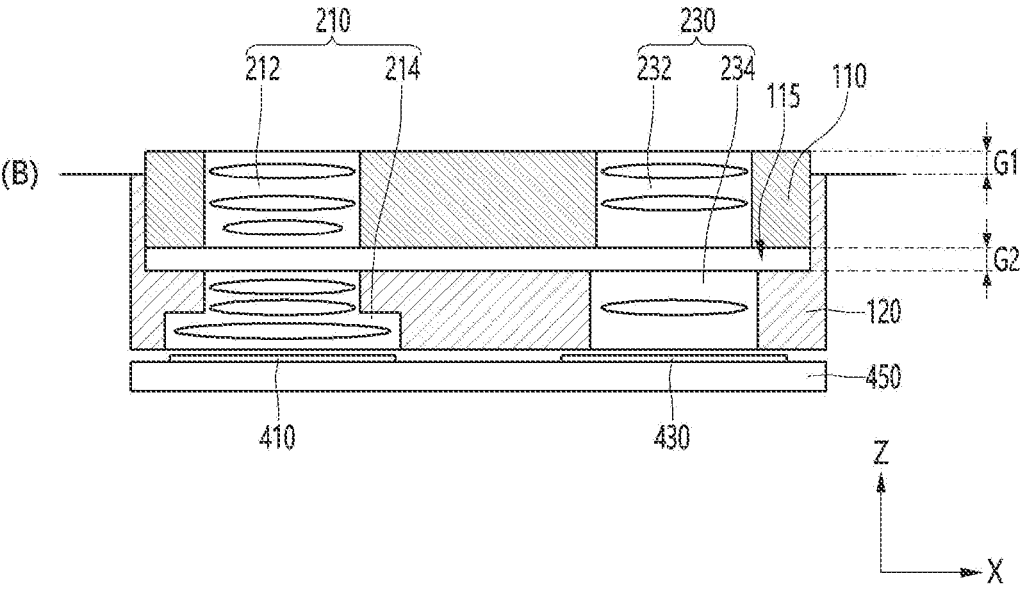
Figure 19:
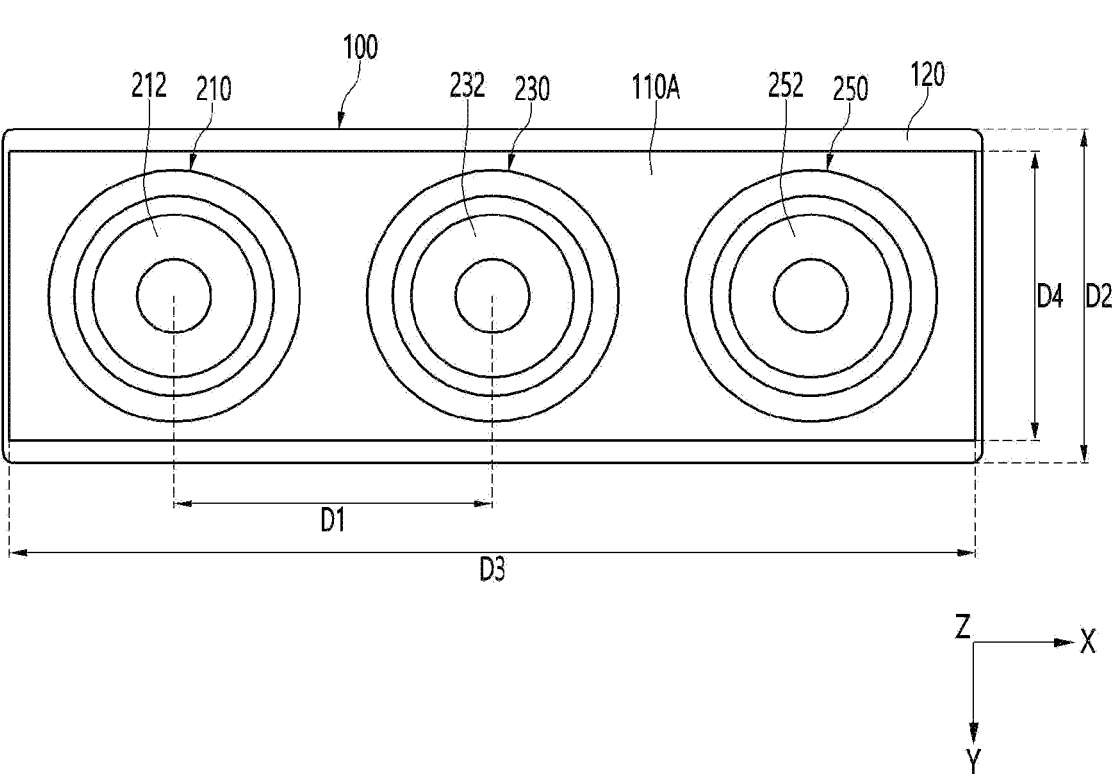
FIG. 19 is another example of FIG. 15, and is an example of a plan view of a camera module having three first lens groups.
Figure 20A:
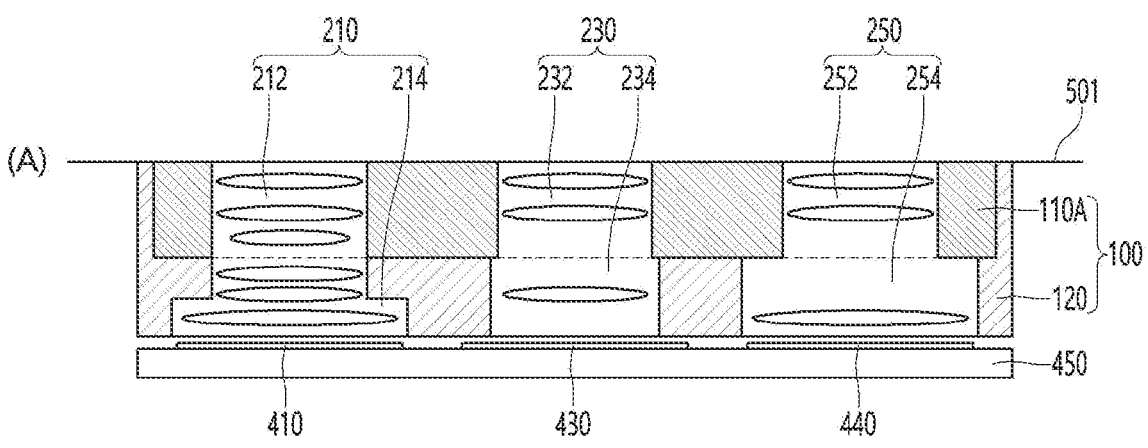
FIGS. 20A and 20B are side cross-sectional views of the camera module of FIG. 19, and FIGS. 20A and 20B are cross-sectional views showing a driving state or before driving.
Figure 20B:
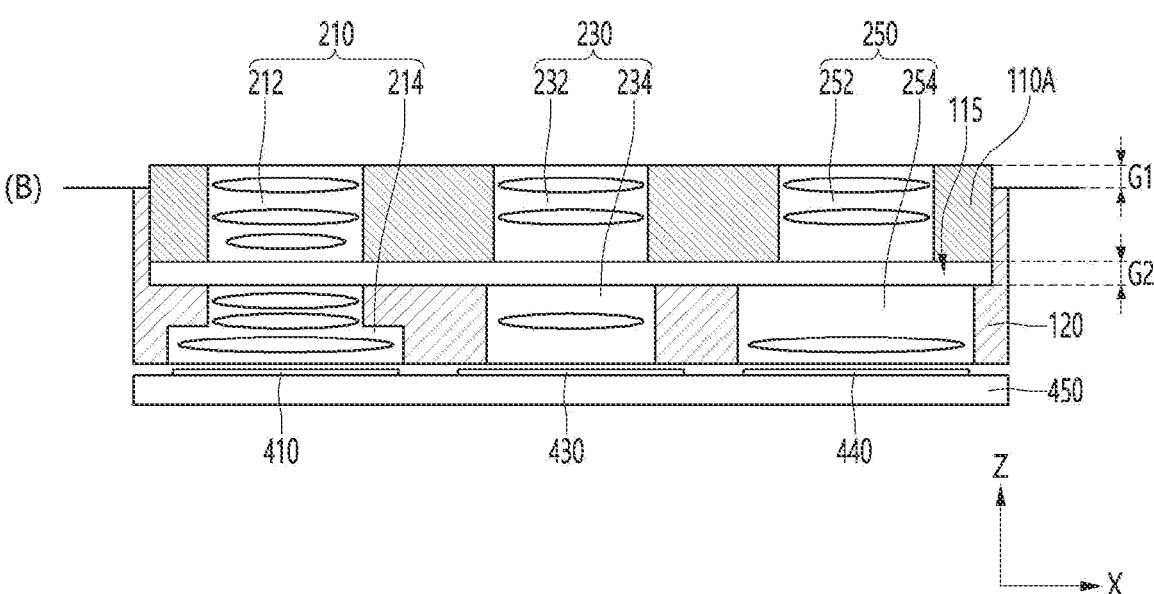

FIG. 15 is an exploded perspective view of a camera module according to a third embodiment of the invention, FIG. 16 is a perspective view showing an example of a driving portion of the camera module in FIG. 15, and FIG. 17 is an example of a plan view shown of a first lens group in the camera module of FIG. 15, and FIGS. 18A and 18B is an example of a side cross-sectional view showing a driving state or before driving of the camera module according to the third embodiment, and FIG. 19 is another example of FIG. 15 and is an example of a plan view of a camera module having a three lens group, and FIGS. 20A and 20B are side cross-sectional views of the camera module of FIG. 19 and FIGS. 20A and 20B are cross-sectional views showing a driving state or before driving. In describing the third embodiment, the same configuration as the first and second embodiments may selectively include the description of the first and second embodiments.

Referring to FIGS. 15 to 18B, the camera module may include a housing 100 including a first holder 110 having a plurality of first lens groups 212 and 232 and a second holder 120 having a plurality of second lens groups 214 and 234, and an image sensor module 400 that converts light incident through the first lens group 212 and 232 and the second lens group 214 and 234 into an electrical signal. The camera module may include a module having a plurality of lens modules 210 and 230 and a plurality of image sensors 410 and 430. The first holder 110 may be coupled to the inside of the second holder 120 or coupled to the upper portion of the second holder 120. The first holder 110 and the second holder 120 may be disposed to overlap in a vertical direction.

As shown in FIG. 16, the second holder 120 has a receiving space 115, and the first holder 110 may be inserted into the receiving space 115 of the second holder 120. The second holder 120 may not be physically connected to the first holder 110. The inner lens groups 214 and 234 of the receiving space 115 may be connected by a support portion 122. The vertical thickness of the first holder 110 may be the same as the depth of the receiving space 115 of the second holder 120, and may be, for example, 4 mm or less. Here, the receiving space 115 may include a structure having a sidewall facing at least one of the side surfaces of the first holder 110 or a portion of the two side surfaces. That is, the sidewall of the receiving space 115 may be a structure having a minimum height that may be guided when the first holder 110 is moved from the second holder 120 in the optical axis direction. As another example, the second holder 120 may have a flat top surface without the receiving space 115.

As shown in FIG. 17, the length D3 of the first holder 110 in the first direction X may be less than or equal to the length DO of the second holder 120 in the first direction X. A length D4 of the first holder 110 in the second direction Y may be less than or equal to a length D2 of the second holder 120 in the second direction Y. The first holder 110 may have a length D3 in the first direction X greater than a length D4 in the second direction Y. The length DO of the second holder 120 in the first direction X may be greater than the length D2 of the second direction Y. Here, the first direction X may be a direction in which the lens modules 210 and 230 are arranged, and the second direction Y may be a direction orthogonal to the first direction X. The housing 100 may be provided in a top view shape in a rectangular shape or a regular rectangular shape. For example, as shown in FIG. 22, when the housing 100 is disposed in the case 501 of the terminal, the length in the first direction X may be longer than the length in the second direction Y. As shown in FIG. 23, when the housing is disposed in the terminal, the length in the second direction Y may be longer than the length in the first direction X. as shown in FIG. 24, when the housing is disposed in the terminal, lengths in the first direction X and the second direction Y may be the same or different from each other.

As shown in FIGS. 16 and 17, the housing 100 may include a plurality of lens modules 210 and 230. The plurality of lens modules 210 and 230 may include a first lens module 210 and a second lens module 230 spaced apart in the first direction X. Here, the first lens module 210 may include a 1-1 lens group 212 and a 2-1 lens group 214 aligned along a first optical axis. The second lens module 230 may include a 1-2 lens group 232 and a 2-2 lens group 234 aligned along a second optical axis. The plurality of first lens groups 212 and 232 disposed on the first holder 110 may be spaced apart from each other by a first interval D1. The plurality of second lens groups 214 and 234 disposed on the second holder 120 may be spaced apart from each other at a first interval. The plurality of first lens groups 212 and 232 may include a 1-1 lens group 212 and a 1-2 lens group 232 spaced apart in the first direction X. The plurality of second lens groups 214 and 234 may include a 2-1 lens group 232 and a 2-2 lens group 234 spaced apart from each other in the first direction X. The first and second holders 110 and 120 may be non-magnetic. The first and second holders 110 and 120 may be made of a metal material or a plastic material, and in the case of the metal material, it may block electromagnetic interference noise, and in the case of the plastic material, it can reduce weight and may be easily combined with the lens.

As shown in FIG. 16, the image sensor module 240 may include a plurality of image sensors 410 and 430 and a printed circuit board 450 on which the plurality of image sensors 410 and 430 are disposed. The image sensors 410 and 430 may include, for example, a first image sensor 410 and a second image sensor 430 spaced apart in the first direction X. In the first lens module 210, the 1-1 lens group 212 may have three to four lenses, and the 2-1 lens group 214 may have three to five lenses. The first lens module 210 may include six to nine lenses, and may include solid lenses or at least one liquid lens between the solid lenses. The liquid lens may be disposed on at least one or both of the plurality of second lens groups. In the second lens module 230, the 1-2 lens group 232 may have three or four lenses, and the 2-2 lens group 234 may have three to five lenses. The second lens module 230 may include six to nine lenses, and may consist of solid lenses, or at least one liquid lens may be disposed between the solid lenses. Here, in the non-driving mode, the minimum distance between the two lenses closest to each other between the lenses of the first holder 110 and the lenses of the second holder 120 facing each other may be 0.5 mm or less, for example, in a range of 0.1 mm to 0.5 mm. Here, the minimum distance is a case in which the first and second lens modules 210 and 230 are not driven or in use, and the distance between the first holder 110 and the second holder 120 may be the minimum. Here, the maximum distance between the two lenses most spaced apart between the lenses of the first holder 110 and the lenses of the second holder 120 facing each other may be 4 mm or more, for example, in a range of 4 mm to 9 mm. Here, the maximum distance is a distance in mode in which the first lens groups 212 and 232 of the first and second lens modules 210 and 230 are moved (Pop-up) in the optical axis direction from the second lens groups 214 and 234, and the distance between the first holder 110 and the second holder 120 may be the maximum. In this way, the plurality of lens modules 210 and 230 are vertically separated into the first holder 110 and the second holder 120, and since the distance between the two adjacent lenses is optimized, the first holder 110 having the plurality of first lens groups 212 and 232 is moved, and the plurality of first lens groups 212 and 232 may be aligned with the second lens groups 214 and 234 along the optical axis in a pop-up state.

The 1-1 lens group 212 and the 2-1 lens group 214 of the first lens module 210 may overlap the first image sensor 410 in a vertical direction. The 1-2 lens group and the 2-2 lens group 234 of the second lens module 230 may overlap the second image sensor 430 in a vertical direction. The first image sensor 410 may convert the light incident through the first lens module 210 into an electrical signal. The second image sensor 430 may convert the light incident through the second lens module 230 into an electrical signal. Any one of the image sensors 410 and 430 may be a color (RGB) sensor, and the other may be a black and white sensor. An optical filter may be disposed on the image sensors 410 and 430.

The first and second lens modules 210 and 230 may generate an image having a difference in image brightness or image quality. For example, one of the first and second lens modules 210 and 230 may be a wide-angle or telephoto lens module, and the other may be a main or general lens module. Any one of the first and second lens modules 210 and 230 may be an ultra-wide-angle lens module. Since the lens modules of various functions are mounded on the housing 100, it is possible to improve user convenience and improve the quality of a photographed image.

The first lens module 210 may have a focal length of 3 mm or more, for example, in a range of 3 mm to 10 mm. The second lens module 230 may be greater than the focal length of the first lens module 210, and may be 10 mm or more, for example, 10 mm to 14 mm. As another example, the sizes of the first image sensor 410 and the second image sensor 430 may be different from each other. The second holder 120 may have a receiving space 115 at an upper portion or an inside thereof, and the first holder 110 may be inserted or coupled to the receiving space 115. The first holder 110 is disposed in the receiving space 115 of the second holder 120, and the first holder 110 with respect to the second holder 120 may be vertically up or moved down to the original position by a driving portion.

As shown in FIGS. 15 and 16, a stator 363 may be disposed on at least one side or both sides of the outer side surfaces of the first holder 110. The stator 363 may be disposed to have a long length in a direction in which the lens modules 210 and 230 are arranged. The stator 363 may be disposed to have a long length in the first direction X. The stator 363 may extend to the outside of the 1-1 lens group 212 and the 1-2 lens group 232. A movable member 361 may be disposed on an inner surface or an outer surface of the second holder 120 facing the stator 363. The movable member 361 may be disposed at a position to face one or a plurality of stators 363. The movable member 361 may be a magnet, and the stator 363 may include a coil. The driving means 360 may include the movable member 361 and the stator 363. Here, the second holder 120 may be provided with a receiving groove for mounting the movable member 361 or a plurality of holes 352 may be provided for transmitting a magnetic field.

The first and second image sensors 410 and 430 may be electrically connected to the printed circuit board 450. The printed circuit board 450 may supply power to the stator 363. The printed circuit board 450 may include a controller (not shown) for controlling the driving of the first holder 110. The stator 363 or the coil may move the first holder 110 in a vertical up direction or a vertical down direction through electromagnetic interaction with the magnet. The magnets and/or coils may be used for AF driving and/or OIS driving. As another example, the driving means may include a piezo member and a shaft, the piezo member is disposed in the second holder 120, and the shaft is an axis guiding the movement of the first holder 110, and the first holder 120 may guide the vertical up or down by the piezo member. Accordingly, the driving member may include at least one of a piezo member, an actuator, and a stepping motor, but is not limited thereto. As another example, the driving portion may include a plurality of leaf springs, and may provide elasticity in a vertical direction through the leaf springs. As another example, a hall sensor may be disposed on at least one of the first and second holders 110 and 120, and the hall sensor may detect movement in a vertical direction.

As shown in FIG. 18A, before the camera module is driven or when the camera device is not in use, the first holder 110 is disposed on the second holder 120. The first holder 110 may be in close contact with the upper surface of the second holder 120 or may be in close contact with an interval of 1 mm or less. The upper surface of the first holder 110 may be disposed on the same horizontal surface as the upper surface of the second holder 120. As shown in FIG. 18B, when the camera module is driven or the camera device is in a mode of use, when the power of the positive polarity is supplied to the stator 363 of the driving portion, the movable member 361 of the first holder 110 moves in an up direction, and protrudes in an up direction from the surface of the case 501 in the second holder 120 by a predetermined distance G. In this case, the first holder 110 may protrude at the distance G1 in the range of 1 mm or more, for example, in a range of 3 mm to 4 mm, based on the upper surface of the second holder 120. For example, the first holder 110 may protrude from the surface of the case of the mobile terminal in a range of 3 mm or more, for example, in a range of 3 mm to 7 mm. In this case, the separation distance G2 between the first holder 110 and the second holder 120 may be 3 mm or more, for example, in the range of 3 mm to 7 mm. Here, the thickness of the first and second holders 110 and 120 on the printed circuit board 450 before the pop-up may be 7 mm or less, and the thickness after the pop-up of the first holder 110 may be in the range of 10 mm 1 mm. By providing a long total length (TTL) of the camera module with the thickness due to the pop-up state, optical performance may be improved. In addition, by separating adjacent upper/lower lens groups as in the above-described distance G2, it is possible to provide a long flange back length (FBL). Thereafter, when the power supplied to the stator 363 is cut off or power of the opposite polarity is supplied to the stator 363, the first holder 110 may be moved to the original position. The driving portion for controlling the movement of the first holder 110 may be controlled by the controller.

FIGS. 19-20B are views illustrating a camera module as another example of FIGS. 17-18B. In describing FIGS. 19-20B, the same configuration as the configuration disclosed above will be referred to the embodiment disclosed above.

Referring to FIGS. 19-20B, the camera module may include a triple lens module. The housing 100 may include first and second holders 110A and 120, and may include first to third lens modules 210, 230, and 250 aligned with different optical axes. The camera module may include first to third image sensors 410, 430, and 440 disposed on one printed circuit board 450. The first holder 110A may include three or more first lens groups 212, 232, and 252. The second holder 120 may include three or more second lens groups 214, 234, and 254. The first holder 110A may include a 1-1 lens group 212, a 1-2 lens group 232, and a 1-3 lens group 252, and the second holder 120 may include a 2-1 lens group 212, a 2-2 lens group 214, and a 2-3 lens group 234. The first lens module 210 vertically overlaps with the first image sensor 410, the second lens module 230 vertically overlaps with the second image sensor 430, and the third lens module 250 may vertically overlap the third image sensor 440. A filter may be disposed on each of the first to third image sensors 410, 430, and 440. The first lens module 210 may be a wide-angle lens module, the second lens module 230 may be a main or general lens module, and the third lens module 250 may be a telephoto lens module. Here, the Fno of the telephoto lens module may be 1.8 or less. Any one of the first to third lens modules 210, 230, and 250 may be implemented as an ultra-wide-angle lens module. The ultra-wide-angle lens module may be provided with an angle of view wider than that of the wide-angle lens module, for example, the angle of view of the wide-angle lens module may be 45 degrees or more or the range of 45 degrees to 90 degrees, and the angle of view of the ultra-wide lens module may be 120 degrees or more. Since the lens modules of various functions is mounted in the housing 100, user convenience may be improved and the quality of a photographed image may be improved. The first lens module 210 may have a focal length of 3 mm or more, for example, in a range of 3 mm to 10 mm. The second lens module 230 may be greater than the focal length of the first lens module 210, and may be 10 mm or more, for example, 10 mm to 14 mm. The third lens module 250 may have a focal length of 10 mm or more, for example, in a range of 10 mm to 14 mm. The first to third lens modules 210, 230, and 250 may have different focal lengths or adjust the sizes of the first to third image sensors 410, 430 and 440 to improve image quality in a desired shooting mode. In this case, another lens module may be set based on the telephoto lens module having the largest focal length among each lens module.

A length D3 of the first holder 110A in the first direction X may be less than or equal to a length D3 of the second holder 120 in the first direction. A length D4 of the first holder 110A in the second direction Y may be less than or equal to a length D2 of the second holder 120 in the second direction Y. The length D3 of the first holder 110A in the first direction X may be greater than the length D2 of the first holder 110A in the second direction Y. The second holder 120 may have a length in the first direction X greater than a length D2 in the second direction Y. Here, the first direction may be a direction in which the lens modules are arranged, and the second direction may be a direction orthogonal to the first direction. The housing 100 may be provided in a top view shape in a rectangular shape or a regular rectangular shape. When the housing 100 has a square shape, a straight line connecting the first to third lens modules 210, 230, and 250 may be provided as a triangular shape. For example, the lens modules may be arranged as shown in FIGS. 22 to 24.

As shown in FIGS. 19-20B, the plurality of first lens groups 212, 232, and 252 disposed in the first holder 110A may be disposed to be spaced apart from each other by a first interval D1. The plurality of second lens groups 214, 234, and 254 disposed on the second holder 120 may be disposed to be spaced apart from each other at a first interval. The plurality of first lens groups 212, 232, and 252 may include a 1-1 lens group 212, a 1-2 lens group 232, and a 1-3 lens group 252 spaced apart from each other in the first direction have. The plurality of second lens groups 214, 234, and 254 may include a 2-1 lens group 214, a 2-2 lens group 234, and a 2-3 lens group 254 spaced apart from each other in the first direction. Here, the housing 100 may include first to third lens modules 210, 230, and 250 arranged in one direction. The first to third lens modules 210, 230, and 250 may be spaced apart from each other in the first direction X or the second direction Y. Here, the first lens module 210 may include a 1-1 lens group 212 and a 2-1 lens group 214 aligned along a first optical axis. The second lens module 230 may include a 1-2 lens group 232 and a 2-2 lens group 234 aligned along a second optical axis. The third lens module 250 may include a 1-3 lens group 252 and a 2-3 lens group 254 aligned along a third optical axis. In the first lens module 210, the 1-1 lens group 212 may have three or four lenses, and the 2-1 lens group 214 may have three to five lenses. The first lens module 210 may include six to nine lenses, and may include solid lenses or at least one liquid lens between the solid lenses. In the second lens module 230, the 1-2 lens group 232 may have three or four lenses, and the 2-2 lens group 234 may have three to five lenses. The second lens module 230 may include six to nine lenses, and may consist of solid lenses, or at least one liquid lens may be disposed between the solid lenses.

In the third lens module 250, the 1-3 lens group 252 may have two or three lenses, and the 2-3 lens group 254 may have three to five lenses. The third lens module 250 may include five to eight lenses, and may consist of solid lenses, or at least one liquid lens may be disposed between the solid lenses. The first holder 110A is driven by a driving means, and the 1-1 lens group 212, the 1-2 lens group 232 and the 1-3 lens group may be moved in the optical axis direction on the second holder 120. Here, in the non-driving mode, the minimum distance between the two lenses closest to each other between the lens of the first holder 110A and the lens of the second holder 120 may be 0.5 mm or less, for example, in the range of 0.1 mm to 0.5 mm. Here, the minimum distance is in a distance when the first to third lens modules 210, 230, and 250 are not driven or not in use, and the distance between the first holder 110A and the second holder 120 may be the minimum. Here, the maximum distance between the two lenses most spaced apart between the lens of the first holder 110A and the lens of the second holder 120 may be 4 mm or more, for example, may be in the range of 4 mm to 9 mm. Here, the maximum distance is in a distance in a mode (Pop-up) in which the first lens groups 212, 232, and 252 of the first to third lens modules 210, 230, and 250 are moved higher than the surface of the case 501 in the optical axis direction from the second lens groups 214, 234, and 254, and the distance between the first holder 110A and the second holder 120 may be the maximum.

A distance between two adjacent optical axes among the first to third optical axes of the first to third lens modules 210, 230, and 250 may be constant or one of them may be larger, but the invention is not limited thereto. As another example, the housing 100 may include a quadruple lens module in the first and second holders 110A and 120. The quadruple lens module may be first to fourth lens modules, and includes the first to third lens modules 210, 230, and 250 described above and a Time of Flight (ToF) lens module (e.g., 272 in FIG. 8). Such a TOF lens module and image sensor may provide a depth data along with two-dimensional data. Alternatively, a ToF lens module may be applied as the third lens module 250. When such a ToF lens module is applied, the camera device may include an infrared element.

Figures 21A, 21B:
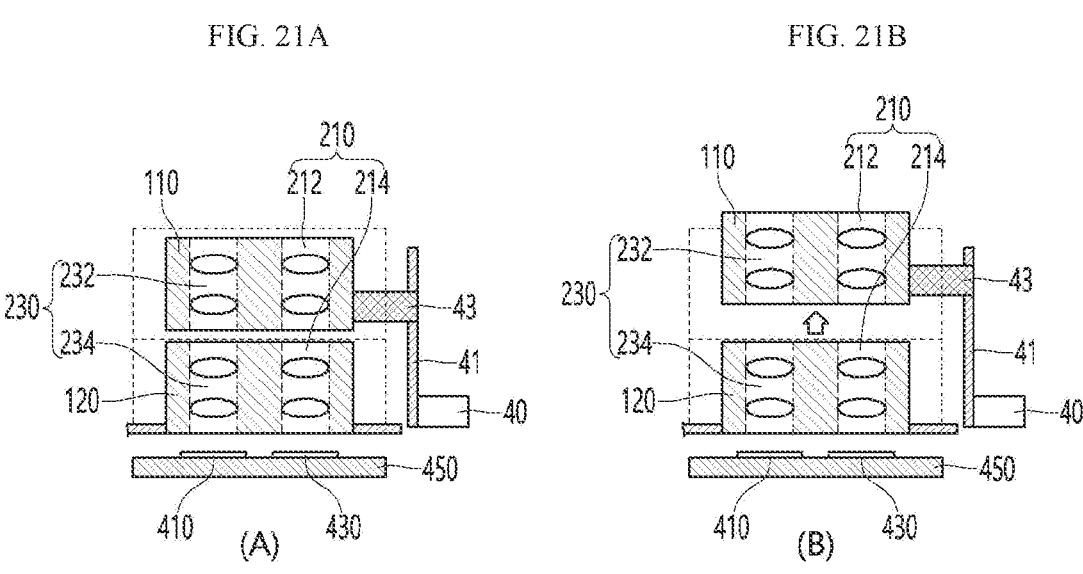
FIGS. 21A and 21B are examples of side cross-sectional views showing a driving state or before driving of the camera module according to the fourth embodiment.

FIGS. 21A and 21B are examples of side cross-sectional views illustrating a camera module according to a fourth embodiment. FIGS. 21A and 21B exemplify two lens modules, but may include three or four lens modules, but is not limited thereto. As shown in FIGS. 21A and 21B, the housing may include first and second holders 110 and 120 stacked in a vertical direction. The housing may include a plurality of lens modules 210 and 230, for example, may include at least two lens modules. Image sensors 410 and 430 and filters (not shown) disposed on the printed circuit board 450 may be respectively disposed under the lens modules 210 and 230.

The first lens module 210 may include a 1-1 lens group 212 disposed in the first holder 110 and a 2-1 lens group 214 disposed in the second holder 230. The second lens module 230 may include a 2-1 lens group 232 disposed in the first holder 110 and a 2-2 lens group 234 disposed in the second holder 230. Each of the 1-1 lens group 212 and the 2-1 lens group 214 of the first lens module 210 may include two or more lenses. Each of the 1-2 lens group 232 and the 2-2 lens group 234 of the second lens module 230 may include two or more lenses. The first holder 110 may be moved in a vertical direction or an optical axis direction by a driving means, and in this case, the 1-1 lens group 212 and the 1-2 lens group 214 of the first lens modules 230 may be moved. The first holder 110 may be driven by a driving means. The driving means may include a guide shaft 41, a moving portion 43 connecting the guide shaft 41 and the first holder 11, and a driving portion 40 for flowing the moving portion 43 through the guide shaft 41. The guide shaft 41 guides the first holder 11 to move in a vertical direction or an optical axis direction, and may be disposed on the outside of the first holder 11 in one or a plurality. The driving portion 40 may include a piezo member, and is stretched or contracted when a voltage is applied. When the driving portion 40 is tensioned, the guide shaft 41 and the moving portion 43 vertically lift the first holder 11, and when the driving portion 40 is contracted, the guide shaft 41 and the moving portion 43 may lower the first holder 11 in a vertical direction. Here, the guide shaft 41 may be provided so as not to be exposed to the outside of the case of the terminal.

The camera module according to the first to fourth embodiments may be coupled to the front or rear of the portable terminal. As shown in FIG. 22, the plurality of first lens groups 212, 232, and 252 may be arranged in a first direction and may be vertically upward or downward at the same time. As shown in FIG. 23, the plurality of first lens groups 212, 232, and 252 may be arranged in the second direction and may be vertically upward or downward at the same time. As shown in FIG. 24, the plurality of first lens groups 212, 232, and 252 may be arranged in the first direction and the second direction, and may be vertically up or down at the same time. In FIGS. 22 to 24, a ToF lens module 272 may be added to the first holder 11 or a camera flash module may be further disposed, but the invention is not limited thereto. The case 501 of such a terminal may have an opening through which the first holder 11 may protrude. In addition, by moving the second holder disposed under the first holder 11 in the horizontal direction, the thickness of the total camera module may be made thinner, and it may be applied to a smart phone having a thin thickness of 11 mm or less. Accordingly, a portion of the first holder 11 may protrude only during use and may not protrude from the outside of the case of a mobile terminal such as a smart phone. Accordingly, in the non-use mode of the camera, it is possible to improve the problem that some of the lens modules of the camera device protrude to the outside of the smart phone, so that it is convenient to carry and the appearance design may be improved, and it may also protect the surface of the camera module from damage.

Figures 25A, 25B, 26:
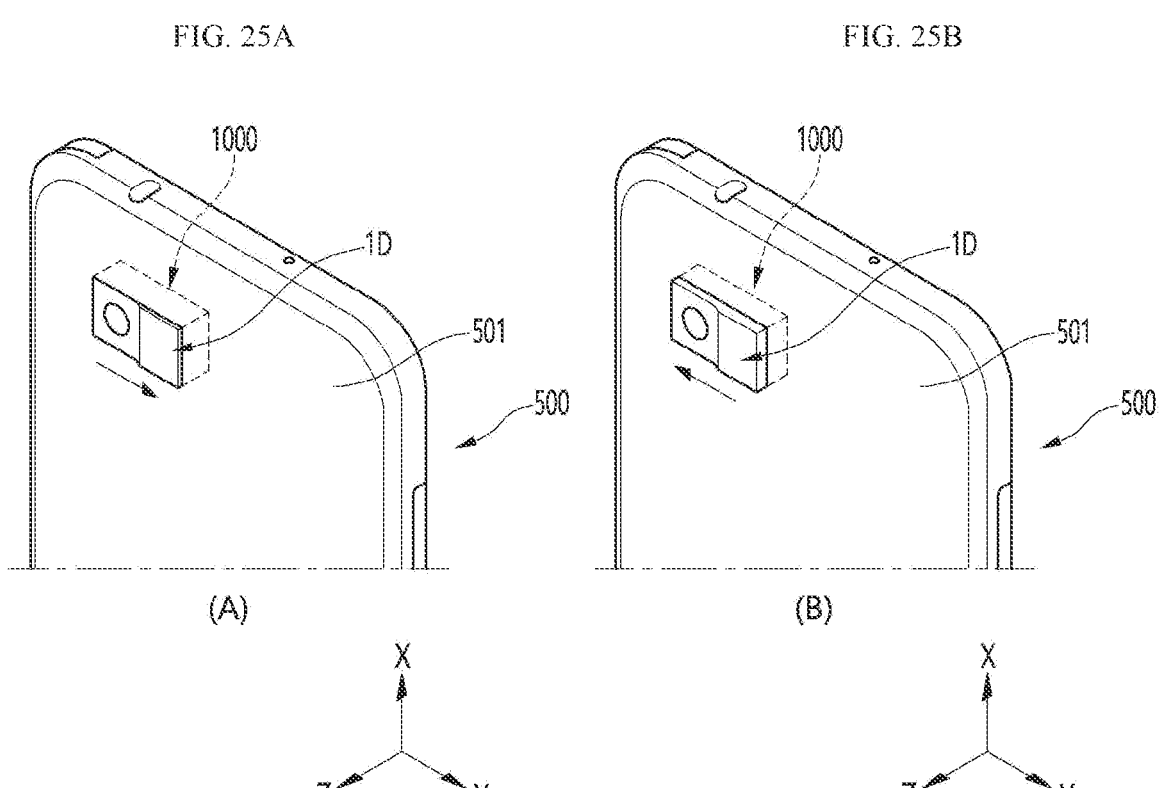
FIGS. 25A and 25B are examples of a perspective view of a mobile terminal to which a camera module is coupled according to a fifth embodiment of the invention.
FIG. 26 is a first example of a cross-sectional side view of the camera module of FIGS. 25A and 25B.
Figure 27:
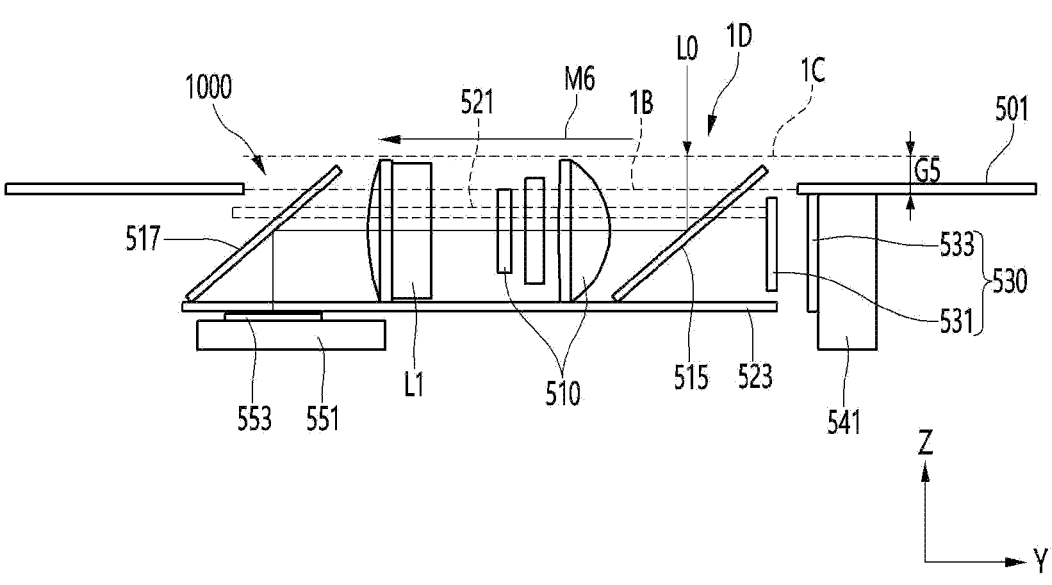
FIG. 27 is an example of driving the camera module of FIG. 26.
Figure 28:
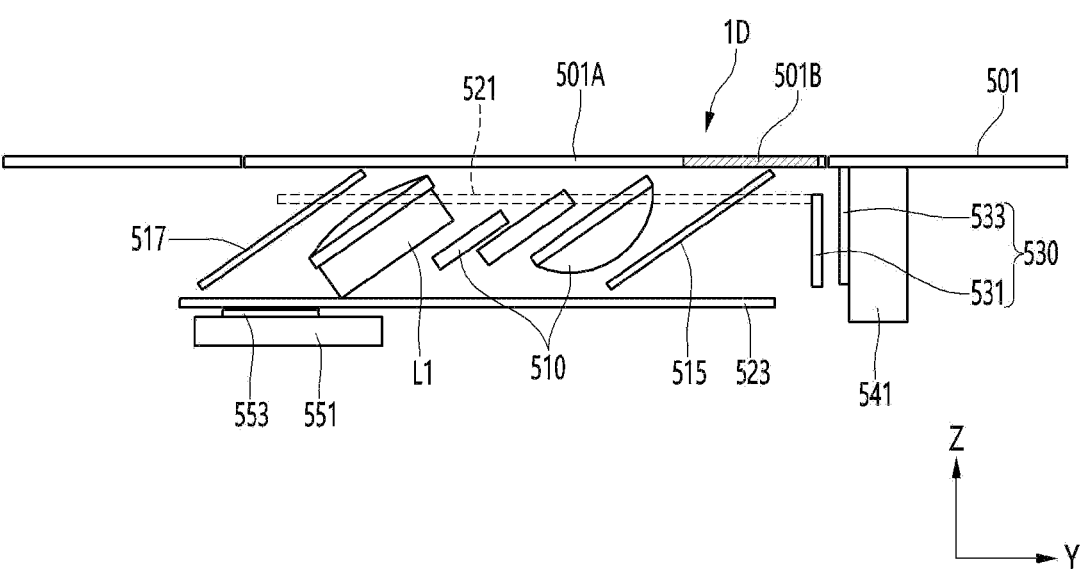
FIG. 28 is a second example of a cross-sectional side view of the camera module of FIGS. 25A and 25B.
Figure 29:
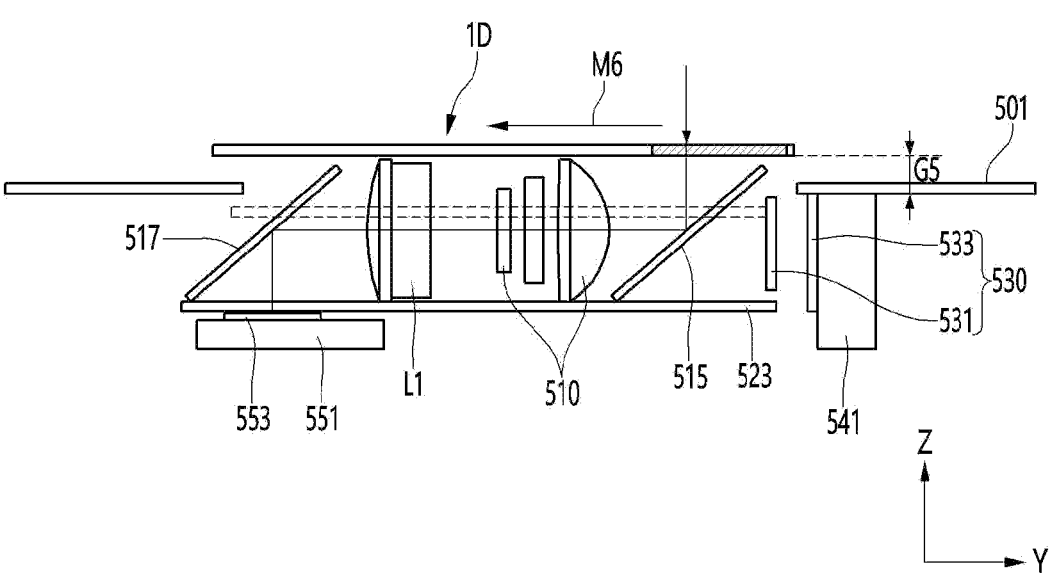
FIG. 29 is an example of driving the camera module of FIG. 28.
Figure 30:
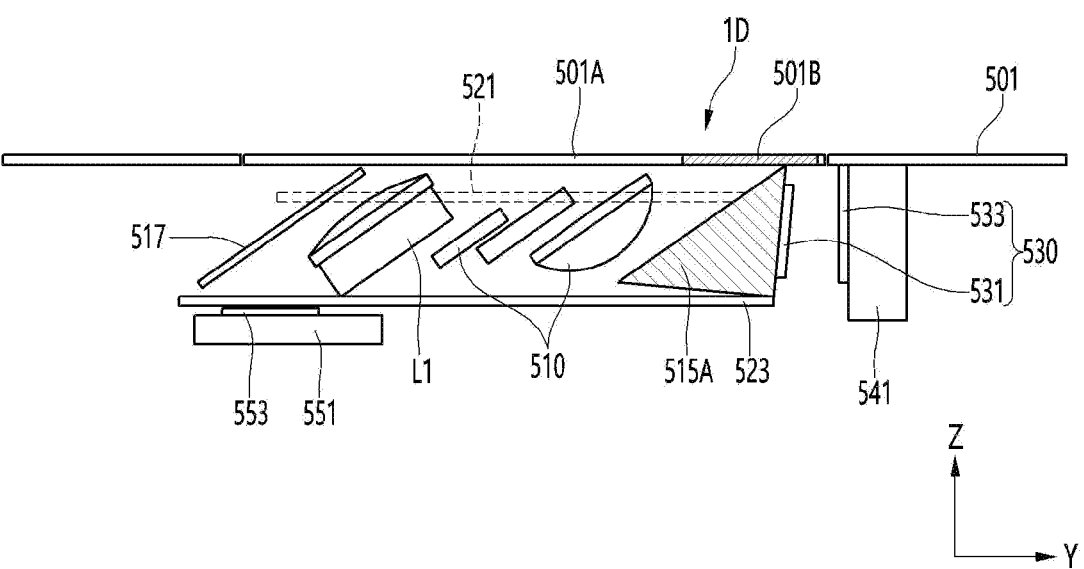
FIG. 30 is a third example of a cross-sectional side view of the camera module of FIGS. 25A and 25B.
Figure 31:
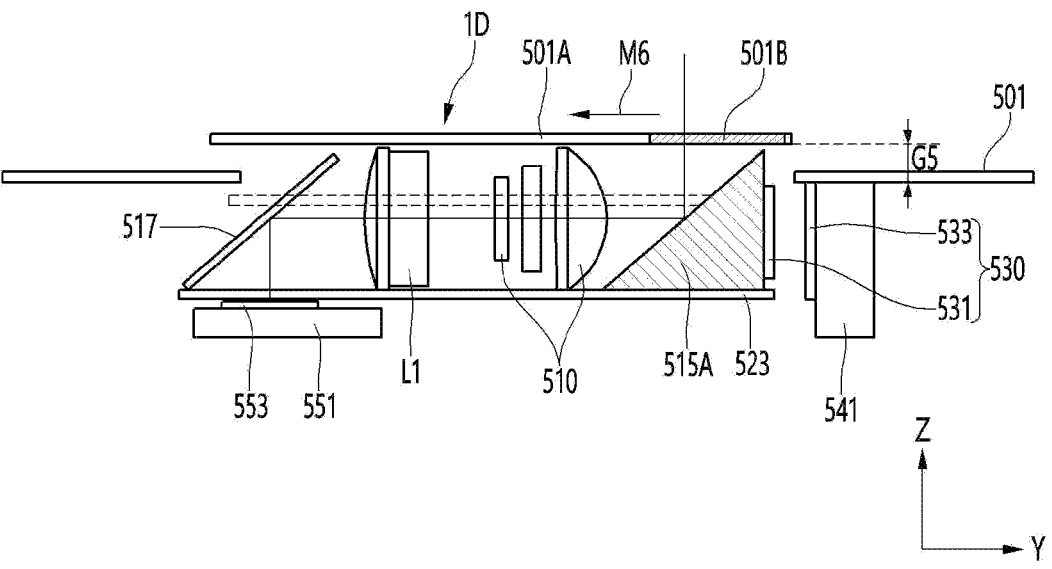
FIG. 31 is an example of driving the camera module of FIG. 30.
Figure 32:
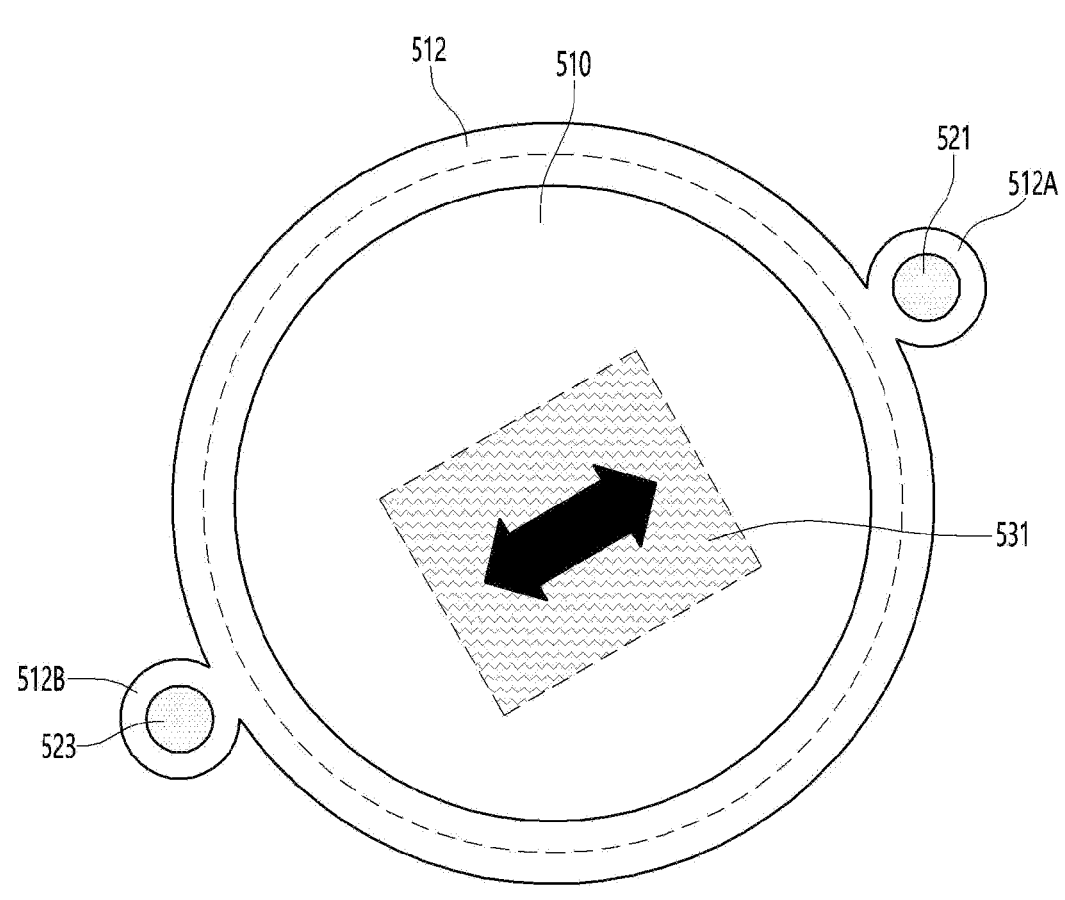
FIG. 32 is a view illustrating a holder and a guide shaft for supporting a lens of a camera module according to a fifth embodiment of the invention.
Figure 33:
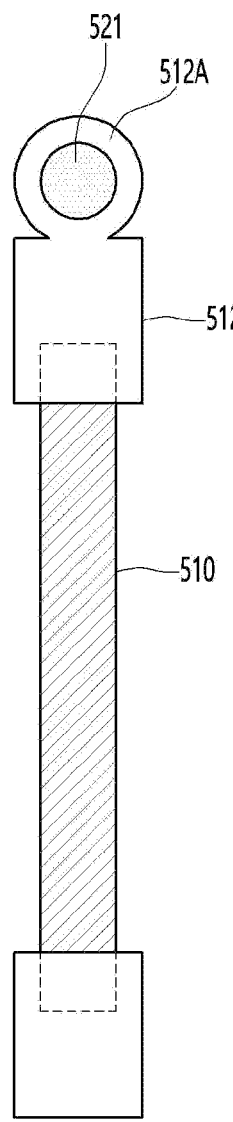
FIG. 33 is an example of another cross-sectional view of FIG. 32.

FIGS. 25A and 25B are examples of a perspective view of a mobile terminal to which a camera module is coupled according to a fifth embodiment of the invention, FIG. 25A is a state before use of the camera, FIG. 25B is a state of use of the camera, FIG. 26 is a first example of a side cross-sectional view of the camera module of FIGS. 25A and 25B, FIG. 27 is a driving example of the camera module of FIG. 26, FIG. 28 is a second example of a side cross-sectional view of the camera module of FIG. 1, FIG. 29 is a driving example of the camera module, FIG. 30 is a third example of a cross-sectional side view of the camera module of FIGS. 25A and 25B, FIG. 31 is a driving example of the camera module of FIG. 30, FIG. 32 is a view showing a holder and a guide shaft supporting the lenses of a camera module according to an embodiment of the invention, and FIG. 33 is an example of another cross-sectional view of FIG. 32. In the description of the fifth embodiment, the same configuration as that of the first embodiment includes the description of the first embodiment.

Referring to FIGS. 25A and 25B, a mobile terminal 500 according to an embodiment of the invention may be a portable electronic device equipped with a camera module 1000, for example, a mobile communication terminal, a smart phone, a tablet PC, or the like. As shown in FIG. 1, the mobile terminal 500 is equipped with a camera module 1000 to photograph a subject. The camera module 1000 may include a plurality of lenses, and the optical axis (Z axis) of the lens may be in a direction perpendicular to the thickness direction (Z axis direction) of the mobile terminal 500, and a thickness direction of mobile terminal 500 may be a direction from a front surface to a rear surface of the terminal or the opposite direction. For example, the optical axis (Z axis) of the plurality of lenses provided in the camera module 1000 may be formed in the width direction or the length direction (X-axis direction or Y-axis direction) of the mobile terminal 500. Therefore, even if the camera module 1000 has functions such as Auto Focusing (hereinafter, AF), Zoom, and Optical Image Stabilizing (hereinafter, OIS), the thickness of the mobile terminal 500 does not increase. Accordingly, it is possible to reduce the size of the mobile terminal 500 and provide a thinner thickness.

The camera module 1000 according to an embodiment of the invention may include at least one of AF, Zoom, and OIS functions. The camera module 1000 having the AF, Zoom, and OIS functions, etc., needs to be provided with various parts, so that the size of the camera module may increase compared to a general camera module. When the size of the camera module 1000 increases, it may become a problem in miniaturization of the mobile terminal 500 in which the camera module 1000 is mounted.

For example, in the camera module, the number of stacked lenses increases for the zoom function, and when a plurality of stacked lenses is formed in the thickness direction of the terminal, the thickness of the terminal also increases according to the number of stacked lenses. Accordingly, when the thickness of the terminal is not increased, the number of stacked lenses cannot be sufficiently secured, and the zoom performance is degraded. In addition, in order to implement the AF and OIS functions, an actuator for moving the lens group in the optical axis direction or in a direction perpendicular to the optical axis should be installed, and when the optical axis of the lens group is formed in the thickness direction of the terminal, the actuator for moving the lens group should also be installed in the thickness direction of the portable electronic device. Accordingly, the thickness of the terminal increases. However, in the camera module 1000 according to the embodiment of the invention, since the optical axis (Y axis) of the plurality of lenses is disposed perpendicular to the thickness direction of the mobile terminal 500 (i.e., parallel to the wide surface of the mobile terminal 500), even if the camera module 1000 having AF, Zoom, and OIS functions is mounted, the mobile terminal 500 may be miniaturized. In addition, the camera module 1000 may be slid-down in the optical axis Y direction and slid-up in the opposite direction. Accordingly, the thickness in the vertical direction of the sliding-down camera module 1000 may be made thinner, thereby making the mobile terminal 1 smaller. And, when using the camera function, the camera module 1000 may be slid-up so that it protrudes to the outside of the case 501 of the mobile terminal 500, and the centers (i.e., optical axes) of the lenses may be aligned on the same straight line. Here, in the sliding-down state, one portion of the lenses in the camera module 1000 on the edge side supports sliding at a fixed position, and the other portion on the edge side is tilted toward the light incident side in the optical axis direction.

The sliding-up is an operation opposite to that of the sliding-down, and the optical axis may be aligned at the center of the lenses. The sliding operation may be a sliding operation in one direction M5 or the opposite direction M6 or a tilt of multi-lens. FIGS. 25A and 25B, in addition to the camera module 1000 according to an embodiment of the invention, a camera module having a different performance may be further disposed in the case 501 of the mobile terminal, but the invention is not limited thereto.

Referring to FIGS. 26 and 27, the camera module 1000 may include a first reflective mirror 515, a lens module 510 having a plurality of lenses, and a second reflective mirror 517. The camera module 1000 may include a printed circuit board 551 and an image sensor 553 disposed on the printed circuit board 551. The camera module 1000 may include a driving means 530 for sliding or tilting the lens module 510, the first reflective mirror 515, and the second reflective mirror 517.

As shown in FIG. 27, the first reflective mirror 515 may be disposed at an angle of 45 degrees to change the light path of the incident light L0 irradiated from the upper portion to a right angle. The first reflective mirror 515 is a mirror closest to the object side, and may reflect incident light toward a plurality of lenses. The second reflective mirror 517 may be disposed at an angle of 45 degrees to change the optical path of the light incident through the plurality of lenses to a right angle. The second reflective mirror 517 is a mirror closest to the sensor, and may reflect incident light toward the image sensor 553 and condense the light to the image sensor 553. The lens module 510 having the plurality of lenses may be disposed between the first reflective mirror 515 and the second reflective mirror 517. The first straight line passing through the centers of the plurality of lenses may be an optical axis, and the light incident through the first reflective mirror 515 is refracted to be emitted to the second reflective mirror 517. The diaphragm may be disposed on the edge side of the incident surface (object-side surface) of any one of the two lenses closest to the first reflective mirror 515 among the plurality of lenses. The lens module 510 may include three or more lenses, for example, three to seven lenses. Among the plurality of lenses, the lens closest to the first reflective mirror 515 may have positive refractive power, and the lens L1 closest to the second reflective mirror 517 may have negative refractive power. The plurality of lenses may include at least one or both of a lens having a positive refractive power and a lens having a negative refractive power. At least one or two of the plurality of lenses may include a convex surface or an aspherical surface in which at least one or both sides of the incident surface and the exit surface are convex. At least one or two of the plurality of lenses may include a concave surface or a flat surface on which at least one of an incident surface and an exit surface is concave. The plurality of lenses may include a solid material or a lens using a liquid. The lens module 510 may include at least one liquid lens. The liquid lens has a conductive liquid and a non-conductive liquid in the cavity, and the curvature of the interface between the conductive liquid and the non-conductive liquid may be adjusted by an external power source. The liquid lens may be disposed closer to the first reflective mirror 515 than the second reflective mirror 517. As another example, the liquid lens may be disposed closer to the second reflective mirror 517 than to the first reflective mirror 515. The cavity of the liquid lens may have a width in a direction adjacent to the first reflective mirror 515 greater than a width in a direction adjacent to the second reflective mirror 517.

In the case of the second straight line extending in a direction perpendicular to the first straight line passing through the centers of the plurality of lenses, the second straight line passing through the center surface or tangent line of each lens may be disposed parallel to each other. The second straight line may be a thickness direction of the mobile terminal. An upper portion of at least one or all of the plurality of lenses may protrude above the case 501 of the mobile terminal as shown in FIGS. 25A, 25B, and 27. Upper portions of the first and second reflective mirrors 515 and 517 may protrude from the upper portion of the case 501 of the mobile terminal as shown in FIGS. 25A, 25B, and 27. The image sensor 553 converts the light reflected through the second reflective mirror 517 into an electrical signal. The image sensor 553 is mounted on a printed circuit board 551. A direction in which light is incident on the image sensor 553 may be a direction perpendicular to the optical axis. A direction horizontal to the upper surfaces of the printed circuit board 551 and the image sensor 553 may be a direction perpendicular to the optical axis.

The camera module 1000 according to an embodiment of the invention may include at least one of a wide-angle lens module, an ultra-wide-angle lens module, and a telephoto lens module. The ultra-wide-angle lens module may be provided with an angle of view wider than that of the wide-angle lens module, for example, the angle of view of the wide-angle lens module may be 45 degrees or more or the range of 45 degrees to 90 degrees, and the angle of view of the ultra-wide lens module may be 120 degrees or more. By mounting a lens module of various functions, it is possible to improve user convenience and improve the quality of a photographed image. An optical filter (not shown) may be disposed between the image sensor 553 and the second reflective mirror 517. The camera device according to an embodiment of the invention may be provided in the state shown in FIG. 27 when the camera is in the non-driving mode or non-use mode, and may be provided in the state shown in FIG. 26 when the camera is in the driving mode or use mode.

Figures 34, 35:
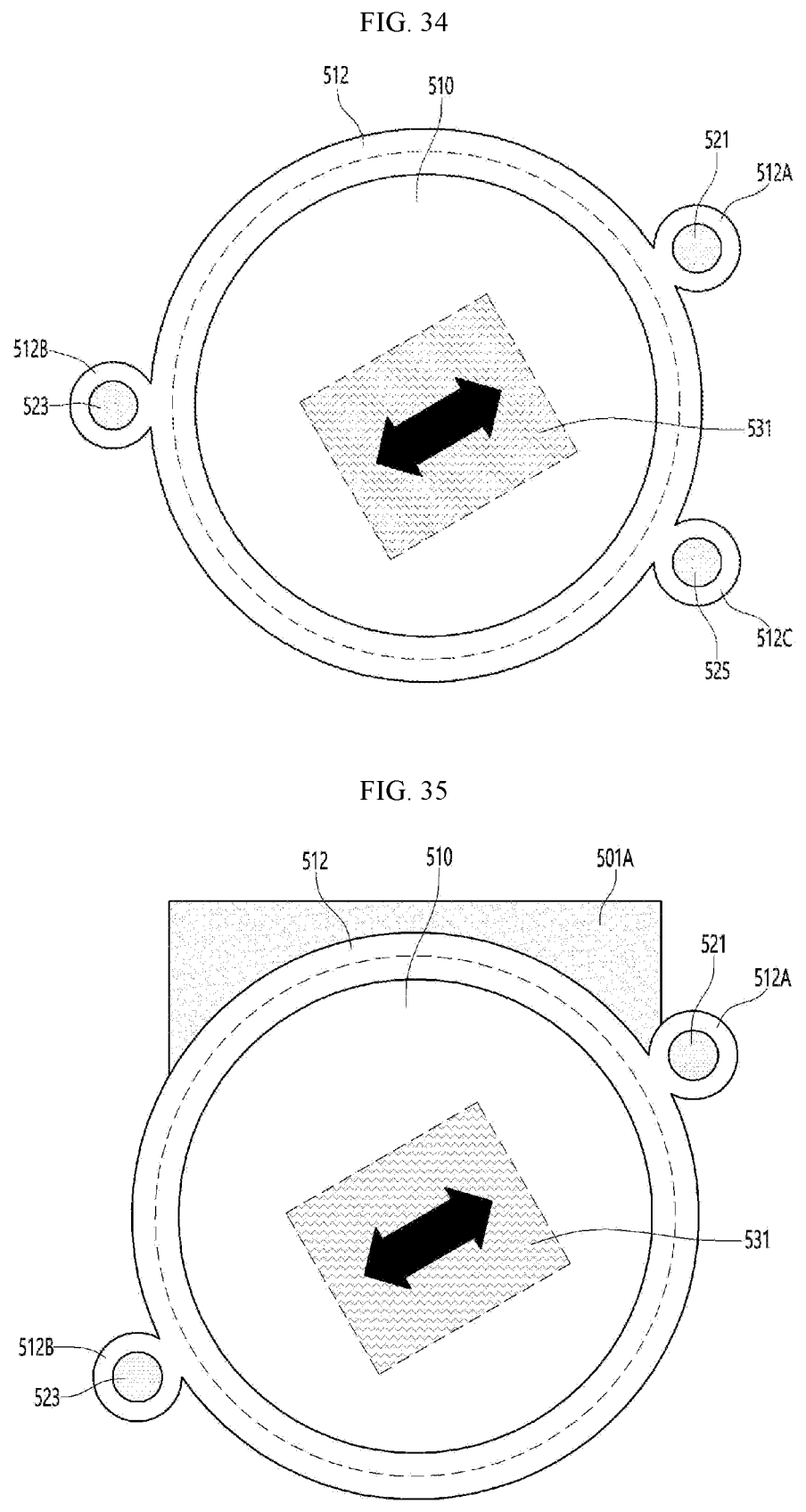

As shown in FIGS. 32 to 34, the camera module may include a holder 512 and guide shafts 521 and 523 formed around each of a plurality of lenses. The holder 512 may protect and support the circumference of each of the lenses. One or a plurality of guide shafts 521 and 523 may be disposed on the outside of the lens module 510, for example, two or three guide shafts 521 and 523 may be disposed on the outside of the lens module 510. The two guide shafts 521 and 523 may be spaced apart from each other at positions facing each other or in a range of 120 degrees to 240 degrees with respect to the center of the lens, as shown in FIG. 32. The guide shafts 521 and 523 may guide the movement of the plurality of lenses along the outside of the plurality of lenses.

The camera module may include movement guide portions 512A and 512B protruding from the outside of the holder 512. The movement guide portions 512A and 512B may be coupled to the guide shafts 521 and 523, respectively. One or more or two or more of the movement guide portions 512A and 512B may be disposed on the outside of the holder 512, for example, two or three. The movement guide portions 512A and 512B have through holes therein, and guide shafts 521 and 523 may be inserted into the through holes. The movement guide portions 512A and 512B may have through holes, and may guide when at least one of the plurality of guide shafts 521 and 523 moves in the optical axis direction. For example, the first guide shaft 521 disposed above the center of the lens module 510 is moved in the optical axis direction, and the second guide shaft 523 is a fixed axis at a location below the center of the lens module 510, and supports the movement of the first guide shaft 521, and may support when the lens module 510 slides down or up. Here, the connection portion between the first movement guide portion 512A supporting the first guide shaft 521 and the holder 512 has a width (e.g., line width) smaller than the width or diameter of the first movement guide portion 512A and may be connected with flexible materials. Accordingly, when the first guide shaft 521 recip-rocates, the connection portion between the first movement guide portion 512A and the holder 512 may provide flex-ibility. As another example, the connection portion may be in contact between the first movement guide portion 512A and the holder 512 in the form of a ball, and may be connected to each other by a ball friction force.

In addition, the connection portion between the second movement guide portion 512B supporting the second guide shaft 523 and the holder 512 has a width (for example, a line width) smaller than the width or diameter of the second movement guide portion 512B and may be connected with a flexible material. Accordingly, when the second guide shaft 523 reciprocates, the connection portion between the second movement guide portion 512B and the holder 512 may provide flexibility. As another example, the connection portion may be in contact between the first movement guide portion 512A and the holder 512 in the form of a ball, and may be connected to each other by a ball friction force. As another example, the first and second movement guide portions 512A and 512B may be formed with open grooves or open recesses in which a portion of the guide shafts 521 and 523 are exposed to enable flow. The guide shafts 521 and 523 may be disposed outside the region where the light is incident. That is, the guide shafts 521 and 523 may be disposed in a region not exposed to the opening of the case 501. Also, the guide shafts 521 and 523 may be arranged in a range that does not affect the light incident on the image sensor 553.

The holder 512 and the movement guides 512A and 512B may be disposed outside the first and second reflective mirrors 515 and 517. Accordingly, each of the guide shafts 521 and 523 may be individually connected to the first reflective mirror 515, each lens, and the second reflective mirror 517. Accordingly, when the structure shown in FIG. 26 is changed to the structure shown in FIG. 27, the first guide shaft 521 may be moved in a direction from the first reflective mirror 515 to the second reflective mirror 517. At this time, the second guide shaft 523 supports the movement of the first and second reflective mirrors 515 and 517 and the plurality of lenses. Accordingly, the upper portions of the lens module 510 and the first and second reflective mirrors 515 and 517 may protrude to the outside of the case 501 of the mobile terminal, and the centers of the plurality of lenses may be aligned on the same optical axis.

Conversely, when switching from the structure shown in FIG. 27 to the structure shown in FIG. 26, the first guide shaft 521 may be moved in a direction from the second reflective mirror 517 to the first reflective mirror 515. At this time, the second guide shaft 523 supports the movement of the first and second reflective mirrors 515 and 517 and the plurality of lenses. Accordingly, the upper portions of the lens module 510 and the first and second reflective mirrors 515 and 517 may be accommodated in the case 501 of the mobile terminal, and the centers of the plurality of lenses may be aligned on different axes. At this time, since the camera module does not protrude from the surface of the mobile terminal, it is possible to protect the lenses and to improve the appearance design in the non-use mode. Here, the height difference G5 between the upper ends of the lens module 510 and the first and second reflective mirrors 515 and 517 in the driving mode and in the non-driving mode may be 2 mm or more, for example, in the range of 4 mm to 10 mm. Accordingly, the upper portion of the camera module may be exposed during use and not exposed when not in use.

The camera module may include a driving means 130 for transmitting a driving force to at least one of the guide shafts 521 and 523. The driving means 530 may include at least one of a piezo member, an actuator, and a stepping motor. The driving means 530 may move at least one guide shaft 521 in the optical axis direction. For example, the piezo member may control the guide shaft 521 that moves linearly according to a physical displacement caused by an applied electric field.

The driving means 530 according to an embodiment of the invention may include an actuator including a movable member 531 disposed outside the first reflective mirror 515 and a stator 533 facing the movable member 531. The movable member 531 may be connected to the first guide shaft 521. The movable member 531 may be disposed in a direction perpendicular to a direction in which the first guide shaft 521 extends, and may be up or down in a direction perpendicular to the direction in which the first guide shaft 521 extends with respect to the first guide shaft 521. When the movable member 531 is a magnet, the stator 533 may be a coil. As another example, when the movable member 531 is a coil, the stator 533 may be a magnet. When external power is applied to the driving means 530, a magnetic field is formed between the drive unit 531 and the movable member 531 according to the polarity of the power applied to the stator 533. At this time, the movable member 531 is connected to the first guide shaft 521, and a force is applied to push the first guide shaft 521 outward from the optical axis due to the magnetic field formed by the power source of the first polarity, and in this case, the first guide shaft 521 may be moved in a direction from the first reflective mirror 515 toward the second reflective mirror 517 (driving mode). In this case, the upper portion of the camera module may protrude through the opening 1D of the case 501 of the terminal. Accordingly, the first reflective mirror 515 reflects the light incident from the object side, and the lens module 510 having a plurality of lenses aligned with the optical axis controls the light incident through the first reflective mirror 515. The light is refracted toward the second reflective mirror 517, and the second reflective mirror 517 may condense the incident light to the image sensor 553. Con-versely, due to the magnetic field formed by the power source of the second polarity, a force pulling the first guide shaft 521 in the direction of the optical axis may be applied. Accordingly, the first guide shaft 521 may move in a direction from the second reflective mirror 517 toward the first reflective mirror 515 (non-driving mode). In this case, the upper portion of the camera module may be accommo-dated inside the case 501 of the terminal, and may be disposed below the line 1B horizontal to the surface of the case 501. In this case, the tilt angles of the first reflective mirror 515, each lens, and the second reflective mirror 517 may be the same. Here, the movable member 531 is con-nected to the first guide shaft 521 in the central region of the lens module 510 when viewed to overlap the lens modules 510 as shown in FIG. 32, and may push or pull with respect to the first guide shaft 521 by a magnetic field. As shown in FIGS. 26 and 27, the stator 533 may be fixed to one surface of the support body 541. The support body 541 is disposed such that the stator 533 faces the movable member 531.

As shown in FIGS. 28 and 29, a protective cover 501A having a transparent window 501B on an upper portion of the camera module may be included. The transparent window 501B is disposed on the first reflective mirror 515, and may transmit incident light to the first reflective mirror 515. The protective cover 501A may support the transparent window 501B and protect an upper portion of the camera module. The protective cover 501A may protrude together with the camera module in the camera driving mode, and may be disposed on the same horizontal plane as the upper surface of the case 501 when the camera is in the non-driving mode. For example, as shown in FIG. 35, the protective cover 501A may be placed on the upper side of the holder 512 of the plurality of lenses or supported on the first guide shaft 521. Accordingly, the protective cover 501A may be sliding up or down along the movement M5 and M6 of the first guide shaft.

As shown in FIGS. 30 and 31, in the camera module, at least one or both of the first reflective mirror 515A and the second reflective mirror 517 may have a triangular prism shape. However, the prism-shaped structure may be arranged in consideration of the height of the reflective mirror, the interference with the movement of the protective cover 501A or other lenses. For example, when the first reflective mirror 515A is disposed in a prism shape, a movable member 531 may be disposed on a rear surface or a vertical plane of the first reflective mirror 515A. The movable member 531 may be moved (M5, M6) to slide up or down together with the first reflective mirror 515A and the first guide shaft 521.

As shown in FIGS. 32 and 33, two guide shafts 521 and 523 may be disposed on opposite sides of each other, and the movement guide portions 512A and 512B may be integrally disposed on the outer holder 512 of the lens, or may be separately connected. As shown in FIG. 34, the guide shafts 521, 523, and 525 and the outer guide portions 512A, 512B, and 512C of the holder 512 are arranged at three different positions, and any one guide shaft 523 arranged on one side of the lens may be spaced apart by more than 120 degrees of the other two guide shaft 521 and 525. These three guide axes 521, 523, and 525 may be disposed in a region that does not interfere with the efficiency of incidence of the first reflective mirror 515 and the efficiency of light collection to the image sensor 553. Here, the angle of view (FOV) of the camera module may be the first angle, and the angle at which the chief ray is incident may be incident at the second angle with respect to the optical axis. The first angle may be, for example, in the range of 20 to 50 degrees, and the second angle may be about ½ of the first angle. The second angle may be a chief ray angle (CRA). Using the angle of view and the CRA, the height of the camera module (i.e., the height in the thickness direction of the terminal) may be set through the relationship between the image sensor 553 and the closest first lens L1 thereto.

Figures 36A, 36B:
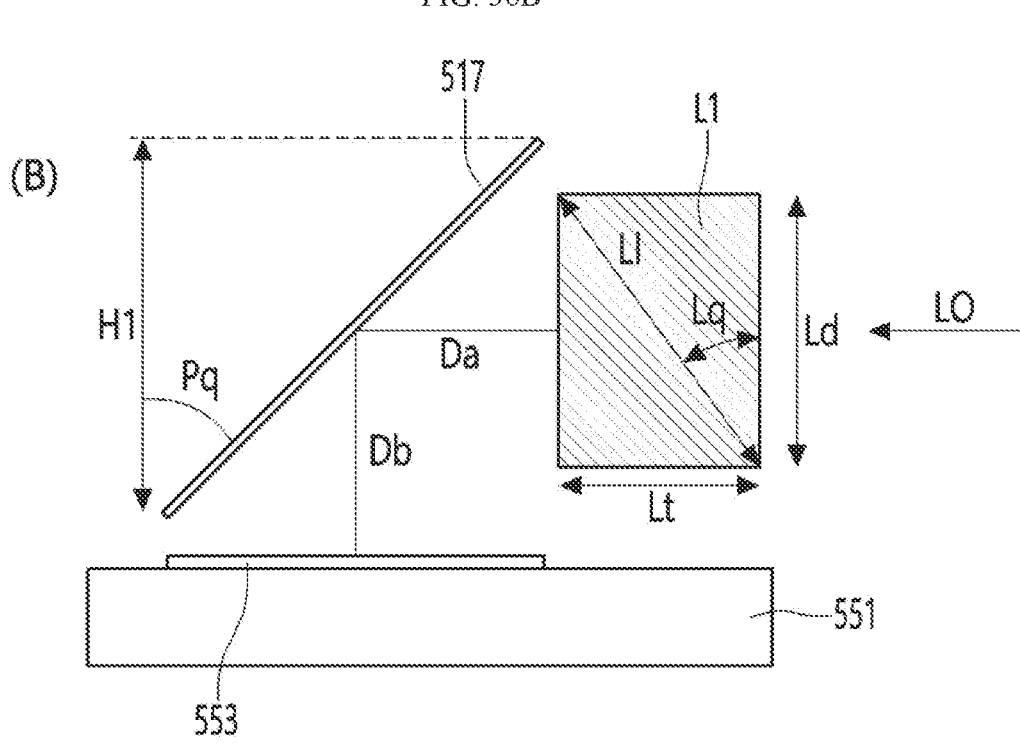
FIG. 36A is a diagram illustrating the relationship between the sensor-side lens and the image sensor.
FIG. 36B is a diagram illustrating the relationship between the sensor-side lens and the second reflective mirror according to incident light.
Figure 36C:
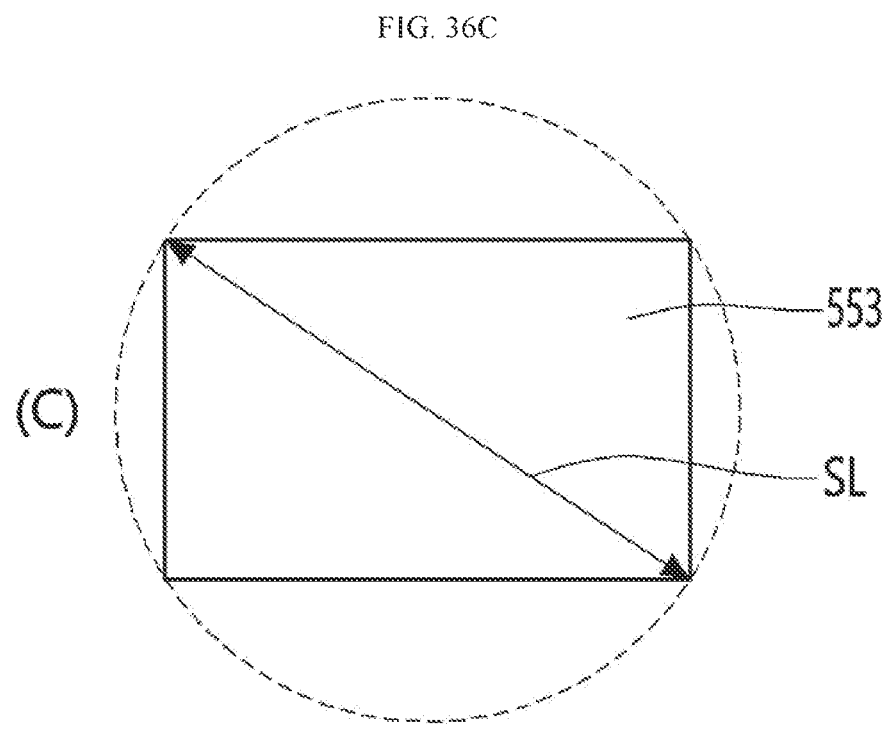
FIG. 36C is a diagram illustrating an image sensor.

As shown in FIG. 36A, when it is assumed that the image sensor 553 and the first lens L1 closest to it face each other, Sa may be obtained as S×tan (Sb). Here, S is the distance between the first lens L1 and the image sensor 553, and Sb may be CRA (i.e., CRA1.0F) incident to the image sensor 553. As shown in FIG. 36C, the diagonal length (i.e., SL=1.0F), that is, the size of the image sensor 553 may be provided in the range of 8 mm to 16 mm.

As shown in FIGS. 36A and 36C, the size of the second reflective mirror 517 is provided at a height H1 that may cover the size of the image sensor 553, and the back focal length BFL may be the sum of the distance Da between the first lens L1 and the second reflective mirror 517 on the path of the incidence light L0 and the distance Db between the second reflective mirror 517 and the image sensor 553. The sum (Da+db) of the distances may be equal to or greater than the height H1 of the second reflective mirror 517. When the diagonal length of the first lens L1 is L1, the thickness is Lt, and the diagonal angle of the first lens is Lq, the height Ld of the first lens L1 may be obtained as S−2Sa. The S may be obtained as a back focal length (Da+db).

The diagonal length L1 is obtained by $$\sqrt{(Ld-3)^2-(Lt)^2} \qquad \text{Equation 1.}$$

The diagonal angle Lq of the first lens L1 may be obtained as asin(Lt/Ll). Accordingly, the angle at which the lens module 510 having the first reflective mirror and the first lens may be tilted should be smaller than the height that the module may occupy in the mobile terminal.

To this end, when the telephoto lens module is the reference (×2.5 times), when FOV is 30 degrees, CRA may be set to 15 degrees. S is about 9.4 mm when the image sensor 553 is 1/1.7 inch, so H1 may be 9.4 mm. In such a camera device, when the effective focal length (EFL) is 17.54, Sa is 2.5 mm and Ld is 6.88. In this case, the height of the lens module is 3 mm or 5 mm larger than Ld, and may be in the range of 10 mm at most.

The diagonal length L1 may be obtained as in Equation 2.

$$Ll=\sqrt{10^2-Lt^2} \qquad \text{Equation 2}$$

When the limit of the lens module in the mobile terminal is 7 mm, L1 must be rotated to be smaller than 7 mm.

$$Pq = a\cos\frac{7\text{ mm}}{L1} = a\cos\frac{7\text{ mm}}{\sqrt{10^2-Lt^2}} \qquad \text{Equation 3}$$

The final required Aθ is obtained as Lq+Pq, and Aθ may be an angle at which the lens module may be tilted.

Therefore, $$A\theta = a\sin\frac{Lt}{L1} - a\cos\frac{H}{L1} \qquad \text{Equation 4}$$

In Equations 3, 4, when Lt is 2.8 mm as in the example, and the lens module height H is 7 mm, Lq=15.6 degrees, Pq=47.6 degrees, and Aθ may be obtained as 63.2 degrees. Thus, the overall effective height may be reduced to 7 mm which is less than 10 mm. Accordingly, the lens height or diameter may be reduced by 35% or less based on the total height, for example, in the range of 25% to 35%. That is, the height of the lens module may be reduced by 30% by the operation before or after the tilt. On the outside of the case 501 of a mobile terminal such as a smart phone, a part of the camera module may protrude only during use and may not protrude during non-use. Accordingly, in the non-use mode of the camera, it is possible to improve the problem that a part of the lens module of the camera device protrudes to the outside of the smartphone, so that it is convenient to carry and the appearance design may be improved. It can also protect the surface of the camera module from damage.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And the differences related to these modifications and applications should be construed as being included in the scope of the invention defined in the appended claims.

The invention claimed is:

1. A camera module comprising:
a first holder having a plurality of first lens groups arranged in a first direction;
a second holder having a plurality of second lens groups arranged in the first direction;
a printed circuit board;
a plurality of image sensors arranged in the first direction on the printed circuit board;
a first driving means configured for moving the first holder in an optical axis direction, and
a second driving means configured for moving the second holder in a second direction orthogonal to the optical axis direction and the first direction;
wherein each of the plurality of first lens groups has a plurality of lenses, and all of the lenses in a given first lens group are aligned with a respective optical axis, which is a different optical axis than an optical axis of another one of the plurality of first lens groups,
wherein each of the plurality of first lens groups is aligned with an optical axis of a respective image sensor of the plurality of image sensors,
wherein each of the plurality of second lens groups has a plurality of lenses, and all of the lenses in a given second lens group are aligned with a respective optical axis, which is a different optical axis than an optical axis of another one of the plurality of second lens groups,
wherein the first holder moves in the optical axis direction by the first driving means,
wherein the second holder moves in a horizontal direction by the second driving means,
wherein the first holder and the second holder are respectively moved by the first and second driving means to be overlapped in the optical axis direction in a driving mode,
wherein the first holder and the second holder are respectively moved by the first and second driving means to be overlapped in the second direction in a non-driving mode,
wherein the first driving means includes a first guide shaft extending in a vertical direction to an outside of the first holder, a first moving portion connecting the first guide shaft and the first holder, and a first driving portion configured to move the first moving portion through the first guide shaft,
wherein the second driving means includes a second guide shaft extending in the horizontal direction to an outside of the second holder, a second moving portion connecting the second guide shaft and the second holder, and a second driving portion configured to move the second moving portion through the second guide shaft,
wherein the first and second driving portions each is a piezo member or a stator,
wherein each of the plurality of first lens groups of the first holder and each of the plurality of second lens groups of the second holder are respectively overlapped in the second direction in the non-driving mode,
wherein a length in the first direction of the first holder is longer than a length in the second direction,
wherein the first direction is a direction of a long side of the second holder,
wherein the second direction is a direction of a short side of the second holder, and
wherein long sides of the first and second holders face each other in the non-driving mode.

2. The camera module of claim 1,
wherein the second holder is configured to move in the horizontal direction orthogonal to the first direction.

3. The camera module of claim 2, wherein the first driving device means and the second driving means are configured to move the first holder and the second holder to overlap in the vertical direction in the driving mode, and in the non-driving mode, move the first holder in a down direction and move the second holder in the horizontal direction with respect to a lower portion of the first holder, and
wherein the first holder and the second holder are simultaneously moved by the first and second driving-devices means.

4. The camera module of claim 1, wherein when the second holder and the first holder overlap in the optical axis direction, each of the plurality of second lens groups vertically overlaps a respective lens group of the plurality of first lens groups, and
each of the plurality of image sensors is aligned with the optical axis of a respective one of the plurality of second lens groups.

5. The camera module of claim 4, wherein the first holder and the first lens groups are configured to pop-up or down to an outside of a case of a mobile terminal by the first driving means, and
wherein the first holder protrudes from a surface of the case of the mobile terminal in a range of 3 mm to 7 mm.

6. The camera module of claim 1,
wherein each of the plurality of second lens groups or each of the plurality of first lens groups is disposed on each of the plurality of image sensors, respectively.

7. The camera module of claim 1, wherein a thickness of the first holder is in a range of 30% to 40% of a TTL of a total optical system,
wherein a thickness of the second holder is in a range of 50% to 60% of the TTL of the total optical system, and
wherein the TTL is a total distance from a lens surface closest to an object to a respective image sensor of the plurality of sensors in a direction of a corresponding respective optical axis.

8. The camera module of claim 1,
wherein the plurality of first lens groups includes two or three lens modules,
wherein the plurality of second lens groups has a same number of lens modules as the lens modules of the plurality of first lens groups, and
wherein one of the lens modules of the first lens groups is a wide-angle lens module and an other is a telephoto lens module.

9. A camera module comprising:

a printed circuit board;

a plurality of image sensors arranged in a first direction on the printed circuit board;

a plurality of optical filters disposed on each of the plurality of image sensors;

a first holder having a plurality of first lens groups arranged in the first direction;

a second holder having a plurality of second lens groups arranged in the first direction;

a first driving means configured to move the first holder in an optical axis direction; and a second driving means configured to move the second holder in a second direction orthogonal to the optical axis direction and the first direction;

wherein each of the plurality of first lens groups has a plurality of lenses, wherein each of the plurality of first lens groups is aligned with an optical axis of a respective image sensor, wherein each of the plurality of second lens groups has a plurality of lenses, wherein the first holder moves in the optical axis direction by the first driving means, wherein the second holder moves in a horizontal direction by the second driving means, wherein the first holder and the second holder are configured to overlap in the optical axis direction by the first and second driving means in a driving mode, wherein the first holder and the second holder are overlapped in the second direction by the first and second driving means in the driving mode, wherein the first driving means includes a first guide shaft extending in a vertical direction to an outside of the first holder, a first moving portion connecting the first guide shaft and the first holder, and a first driving portion configured to move the first moving portion through the first guide shaft, wherein the second driving means includes a second guide shaft extending in the horizontal direction to an outside of the second holder, a second moving portion connecting the second guide shaft and the second holder, and a second driving portion configured to move the second moving portion through the second guide shaft, wherein the first and second driving portions each is a piezo member or a stator, wherein each of the plurality of first lens groups of the first holder and each of the plurality of second lens groups of the second holder are respectively overlapped in the second direction in a non-driving mode, wherein a length in the first direction of the first holder is longer than a length in the second direction, wherein the first direction is a direction of a long side of the second holder, wherein the second direction is a direction of a short side of the second holder, and wherein long sides of the first and second holders face each other in the non-driving mode.

10. The camera module of claim 9, wherein the plurality of optical filters are disposed inside the second holder and are moved in the second direction together with the second holder in the non-driving mode.

11. The camera module of claim 9, wherein the first holder is configured to protrude to an outside of a case by the first driving means, and wherein a length in the first direction of the first holder is longer than a length of the first holder in the second direction.

12. The camera module of claim 9, wherein the first holder is configured to protrude to an outside of a case of a mobile terminal by the first driving means, wherein a length of the first holder in the first direction and is same as a length of the first holder in the second direction, and wherein the first holder protrudes from a surface of the case of the mobile terminal in a range of 3 mm to 7 mm.

13. The camera module of claim 9, wherein when the second holder and the first holder overlap in the optical axis direction, each of the plurality of second lens groups overlaps each of the plurality of first lens groups, respectively, in the optical axis direction, and each of the plurality of image sensors is configured to respectively align with the optical axis of each of the plurality of second lens groups.

14. The camera module of claim 9, wherein the first driving means and the second driving means are configured to move the first holder and the second holder to overlap in the vertical direction in the driving mode, and move the first holder in a down direction in the non-driving mode, and move the second holder in the horizontal direction with respect to a lower portion of the first holder, and wherein the first holder and the second holder are configured to simultaneously move by the first and second driving means.

15. The camera module of claim 9, wherein each of the plurality of second lens groups is respectively disposed between each of the plurality of first lens groups and each of the plurality of image sensors by the first and second driving means in the driving mode, and wherein the plurality of optical filters is moved in the second direction together with the second holder in the non-driving mode.

16. The camera module of claim 9, wherein a thickness of the first holder is in a range of 30% to 40% of a TTL of a total optical system, wherein a thickness of the second holder is in a range of 50% to 60% of the TTL of the total optical system, wherein the plurality of first and second lens groups include two or three lens modules, wherein one of the two or three lens modules is a wide-angle lens module and an other is a telephoto lens module, and wherein TTL is a distance from a lens surface closest to an object to a respective image sensor of the plurality of sensors in a direction of a corresponding respective optical axis.

17. The camera module of claim 9, wherein when the first and second holders overlap in the optical axis direction, a minimum distance between lenses of the first lens group and lenses of the second lens group facing each other is 0.5 mm or less, and a maximum distance between the lenses of the first lens group and the lenses of the second lens group facing each other is 4 mm or more.

18. The camera module of claim 9, wherein the plurality of first lens groups includes a 1-1 lens group and a 1-2 lens group arranged in the first direction, wherein the plurality of second lens groups includes a 2-1 lens group and a 2-2 lens group arranged in the first direction, wherein the 1-1 lens group and the 2-1 lens group are a first lens module, wherein the 1-2 lens group and the 2-2 lens group are a second lens module, wherein a lens closest to an object side in the 1-1 lens group and in the 2-1 lens group has a positive refractive power, wherein a lens closest to the image sensors in the 1-2 lens group and in the 2-2 lens group has a negative refractive power, and wherein the first and second lens modules have different F numbers.

19. The camera module of claim 9, wherein a moving distance of the first holder is shorter than a moving distance of the second holder.

\* \* \* \* \*